(12) United States Patent
Leeb et al.

(10) Patent No.: US 10,470,361 B2
(45) Date of Patent: Nov. 12, 2019

(54) DEVICE FOR DISCHARGING FLUID AND/OR SOLID ACTIVE MATERIALS AND METHOD FOR CONTROLLING SUCH A DEVICE

(71) Applicant: HORSCH LEEB Application Systems GmbH, Oberpöring (DE)

(72) Inventors: Theodor Leeb, Wallersdorf (DE); Otto Hirthammer, Hirschling (DE)

(73) Assignee: HORSCH LEEB Application Systems GmbH, Oberpöring (DE)

( * ) Notice: Subject to any disclaimer, the term of this patent is extended or adjusted under 35 U.S.C. 154(b) by 255 days.

(21) Appl. No.: 15/022,384

(22) PCT Filed: Sep. 18, 2014

(86) PCT No.: PCT/EP2014/069937
§ 371 (c)(1),
(2) Date: Jul. 22, 2016

(87) PCT Pub. No.: WO2015/040133
PCT Pub. Date: Mar. 26, 2015

(65) Prior Publication Data
US 2016/0316617 A1 Nov. 3, 2016

(30) Foreign Application Priority Data
Sep. 18, 2013 (DE) .................. 10 2013 110 304

(51) Int. Cl.
*A01C 23/04* (2006.01)
*A01C 15/00* (2006.01)
(Continued)

(52) U.S. Cl.
CPC ............ *A01C 23/047* (2013.01); *A01C 15/00* (2013.01); *A01M 7/0057* (2013.01); *B60P 3/30* (2013.01);
(Continued)

(58) Field of Classification Search
CPC .... A01C 23/047; A01C 15/00; A01M 7/0057; B60P 3/30; G01C 19/00; G01S 19/13
(Continued)

(56) References Cited

U.S. PATENT DOCUMENTS 4,709,857 A * 12/1987 Wilger ................ A01M 7/0075
239/164
4,946,102 A * 8/1990 DeWitt ............... A01M 7/0075
239/167

(Continued)

FOREIGN PATENT DOCUMENTS

DE 3202569 A1 8/1983
DE 19962687 C2 4/2002
(Continued)

OTHER PUBLICATIONS

Wikipedia, Sensor data fusion, https://de.wikipedia.org/w/index.php?title-Sensordatenfusion&oldid=107055308; original and translation.
(Continued)

*Primary Examiner* — Muhammad Shafi
(74) *Attorney, Agent, or Firm* — Erickson Kernell IP, LLC; Kent R. Erickson

(57) ABSTRACT

A device for spreading active agents comprising: a boom, which is arranged pivotably about a rotation axis; a sensor arrangement for the detection of an angular velocity of the boom about the rotation axis; a sensor for the detection of an angular position of the boom; a control unit processing output signals from the sensor; and an actuator, acting on the present angular position of the boom based on control signals from the control unit. For the determination of an angular position of the boom, the control unit calculates an angular position of the boom in relation to a reference plane by integration of the angular velocity and merges the angular position calculated by means of the angular velocity, with (Continued)

the detected angular position to determine the present angular position of the boom to return the boom to a desired angular position.

21 Claims, 6 Drawing Sheets

(51) Int. Cl.
    *A01M 7/00*         (2006.01)
    *G01C 19/00*       (2013.01)
    *B60P 3/30*         (2006.01)
    *G01S 19/13*        (2010.01)
    *G01C 21/16*       (2006.01)

(52) U.S. Cl.
    CPC ............. *G01C 19/00* (2013.01); *G01C 21/16* (2013.01); *G01S 19/13* (2013.01)

(58) Field of Classification Search
    USPC ........................................................ 701/50
    See application file for complete search history.

(56) References Cited

U.S. PATENT DOCUMENTS

| | | | |
|---|---|---|---|
| 5,348,226 A * | 9/1994 | Heiniger | A01M 7/0057 239/1 |
| 5,794,852 A * | 8/1998 | Wald | A01M 7/0057 239/167 |
| 5,927,606 A * | 7/1999 | Patterson | A01M 7/0075 239/167 |
| 6,131,821 A | 10/2000 | Nejsum | |
| 6,834,223 B2 * | 12/2004 | Strelioff | A01M 7/0057 239/167 |
| 7,150,419 B1 * | 12/2006 | Tomlonovic | A01M 7/0053 239/722 |
| 8,235,231 B2 | 8/2012 | Schneider et al. | |
| 9,045,039 B2 * | 6/2015 | Ringer | F16J 12/00 |
| 9,151,013 B2 | 10/2015 | Glitza | |
| 10,104,825 B2 * | 10/2018 | Blunier | A01B 59/048 |
| 2005/0251026 A1 * | 11/2005 | Stone | A61B 34/20 600/424 |
| 2007/0084352 A1 | 4/2007 | Yuen et al. | |
| 2009/0069987 A1 | 3/2009 | Omelchenko et al. | |
| 2009/0082930 A1 | 3/2009 | Peters | |
| 2009/0118892 A1 | 5/2009 | Yamashita et al. | |
| 2011/0282554 A1 * | 11/2011 | Keye | A01M 7/0057 701/49 |
| 2012/0211301 A1 | 8/2012 | Clark et al. | |
| 2012/0215410 A1 | 8/2012 | McClure et al. | |

FOREIGN PATENT DOCUMENTS

| | | |
|---|---|---|
| DE | 102004033900 A1 | 7/2005 |
| DE | 102004004491 A1 | 8/2005 |
| DE | 102007045846 A1 | 4/2009 |
| DE | 102010035291 A1 | 3/2012 |
| DE | 102013110304.9 | 9/2013 |
| DK | 2559332 T3 | 3/2015 |
| EP | 0922385 A1 | 6/1999 |
| EP | 1416095 A1 | 5/2004 |
| EP | 1444894 A1 | 8/2004 |
| EP | 2042276 A2 | 4/2009 |
| EP | 2123588 A1 | 11/2009 |
| EP | 2308755 A2 | 4/2011 |
| EP | 2042276 B1 | 11/2011 |
| EP | 2511678 A1 | 10/2012 |
| EP | 2559332 A1 | 2/2013 |
| EP | 3183963 B1 | 5/2018 |
| GB | 1380029 A | 1/1975 |
| GB | 2252295 A | 8/1992 |
| JP | 06178603 A | 6/1994 |
| JP | 2001275409 A | 10/2001 |
| JP | 2004321135 A | 11/2004 |
| JP | 2004350567 A | 12/2004 |
| JP | 200829261 A | 2/2008 |
| JP | 2008029261 A | 2/2008 |
| JP | 2008129813 A | 6/2008 |
| JP | 201130464 A | 2/2011 |
| JP | 2011030464 A | 2/2011 |
| RU | 2241328 C1 | 12/2004 |
| RU | 2242116 C1 | 12/2004 |
| WO | 9737533 A1 | 10/1997 |
| WO | 0036376 A1 | 6/2000 |
| WO | 0134511 A1 | 5/2001 |
| WO | 2004112610 A2 | 12/2004 |
| WO | WO-2004112610 * | 12/2004 |
| WO | WO-20041126110 A2 * | 12/2004 |
| WO | 2007046980 A2 | 4/2007 |
| WO | 2010121713 A1 | 10/2010 |
| WO | 2012045964 A1 | 4/2012 |
| WO | 2012146255 A1 | 11/2012 |
| WO | 2015040133 A1 | 3/2015 |

OTHER PUBLICATIONS

Anthonis et al., Implementation of an Active Horizontal Suspension on a Spray Boom, American Society of Agricultural Engineers, 2000, pp. 213-220, vol. 43(2).

Kölner Labor für Baumaschinen (KLB)—Deutsch/Cologne Laboratory for Construction Machinery (KLB)—German, http://www.mobilearbeitsmaschine.de:80/home.html, Feb. 2012, and Google Translate English translation.

Handbuch der Mess—und Automatisierungstechnik im Automobil/ Handbook of the Measuring and automation technology in the automobile Vehicle electronics, vehicle mechatronics 2nd, completely edited edition with 330 illustrations, Springer, 2006 Germany.

Khot et al., Sensor fusion for improving the estimation of roll and pitch for an agricultural sprayer, ScienceDirect, Biosystems Engineering 101 (2008), pp. 13-20, www.elsevier.com/locate/issn/ 15375110.

Ooms et al., Measurements of the horizontal sprayer boom movements by sensor date fusion, Elsevier Science, Computers and Electronics in Agriculture, 33 (2002), pp. 139-162, www.elsevier. com/locate/compag.

Tahmasebi et al., Active Force Control Applied to Spray Boom Structure, Applied Mechanics and Materials, vol. 315 (2013) pp. 616-620.

Ismail et al., "Materials Sciences and Engineering", [gefunden18.01 .2018] Ursprunglicher Dateiname:D38_Auszug aus www.scientific. net.pdf.

"Posture and Vibration Control of the Arms of Boom Sprayer", he Proceedings of the Symposium on the Motion and Vibration Control.

"Sensordatenfusion", Wikipedia, (20120821), URL: https://de. wikipedia.org/w/index.php?title=Sensordatefusion&oldid= 107055308,XP055439738; date of publication Aug. 21, 2012.

* cited by examiner

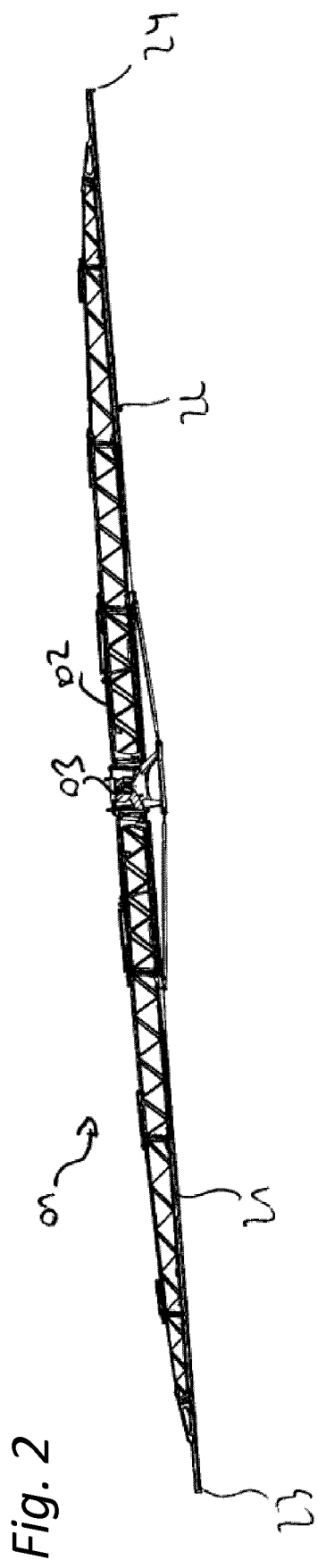
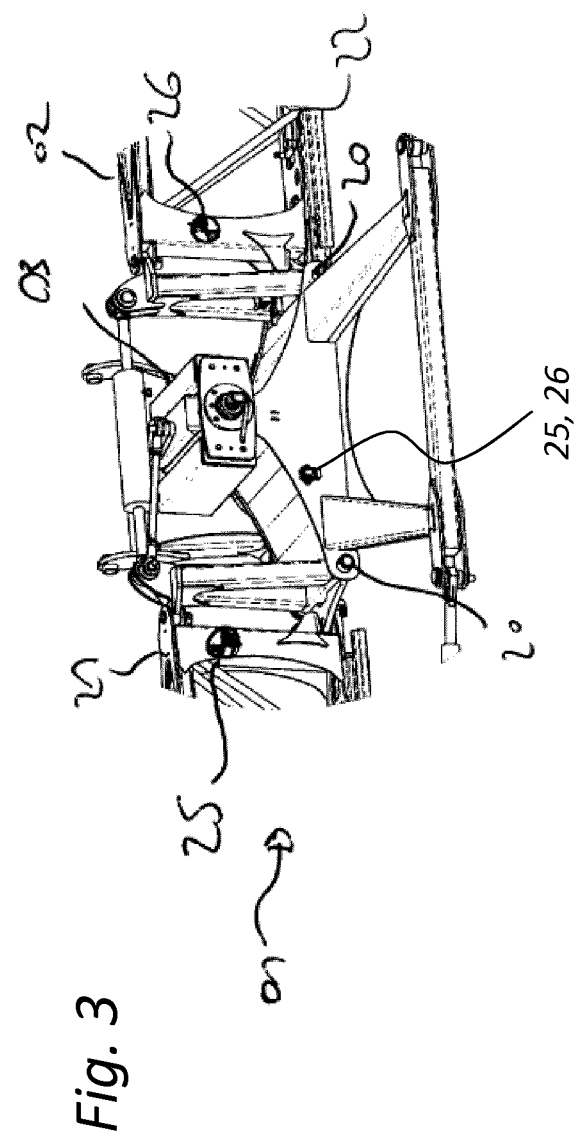
Fig. 2
Fig. 3

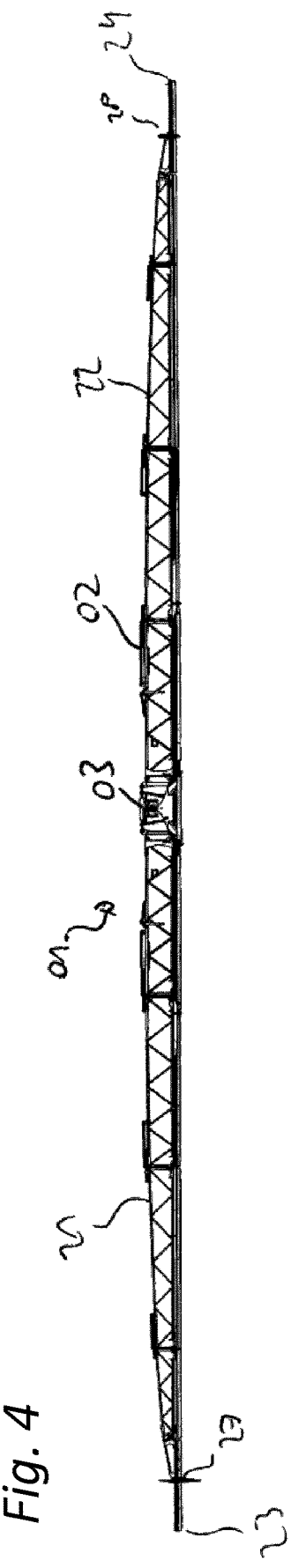
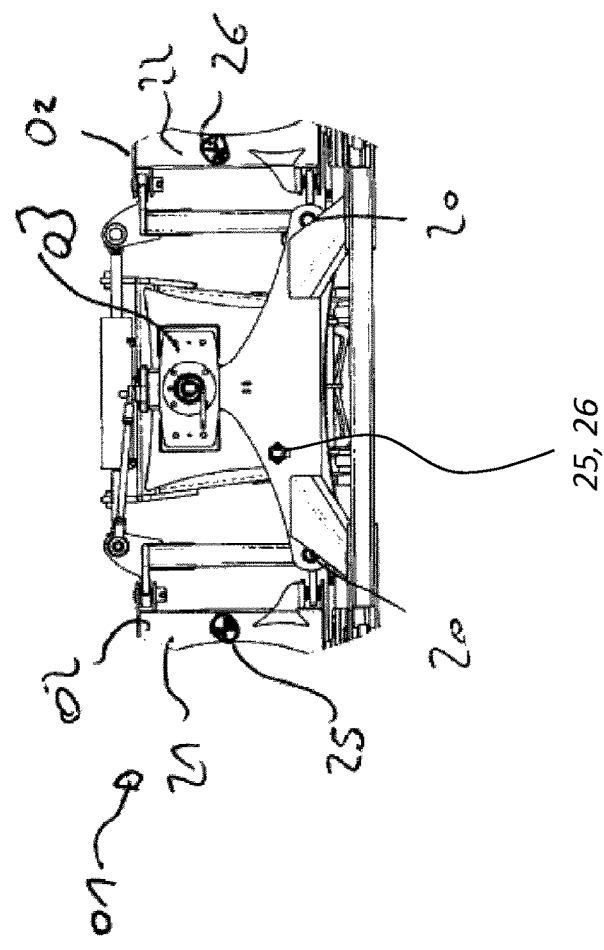
Fig. 4
Fig. 5

DEVICE FOR DISCHARGING FLUID AND/OR SOLID ACTIVE MATERIALS AND METHOD FOR CONTROLLING SUCH A DEVICE

CROSS-REFERENCE TO RELATED APPLICATIONS

This application claims priority from German Application No. DE 10 2013 110 304.9 filed Sep. 18, 2013, the contents of which are incorporated herein by this reference.

FIELD

The present invention relates to a device for spreading liquid and/or solid active agents according to the preamble of the independent claim 1 as well as to a method for the motion control and/or motion regulation of a device for spreading liquid and/or solid active agents according to the preamble of claim 11.

BACKGROUND

Field sprayers and spray booms hitched to work machines, such as tractors, in some cases have very large working widths of more than 20 meters. Such wide spray booms are folded and collapsed in for transport purposes. In the field, symmetrical cantilevered arms of several meters length are located on both sides of the work machine, which cantilevered arms have a varying spacing from the ground according to surface conditions and field relief. Since the downward-directed nozzles for spreading a spraying agent, for instance, a plant protection agent, which nozzles are arranged on the cantilevered arms, each have a defined spray cone, varying the spacing of the nozzles to the ground results in an uneven covering of the field with spraying agent. In addition, the danger of the spraying agent drifting greatly increases as the distance of the spray nozzles from the ground increases, since even slight air movements negatively affect the finely dispersed drops.

With increasing cantilever dimensions and the associated working width there is therefore a necessity to guide the spray boom at as uniform a spacing from the ground as possible, because minimal inclines of the spray boom will lead to large spacing differences of the nozzles to the ground.

In this context, it is known to suspend a spray boom from a carrier vehicle to be rotatable or pivotable about at least one axis of rotation about a central pivot point. The rotation or pivot axis in this instance preferably runs parallel to the longitudinal axis of the carrier vehicle. In order to ensure an even spreading of the spraying agent, the spacing between the top surface of the growth and the spray nozzles must be constantly controlled to a defined spacing. On horizontal agricultural fields, this can generally be achieved by self-leveling, in which the spray boom aligns itself in the horizontal plane with the center of gravity of the spray boom being located below the pivot point and the spray boom being suspended, for instance, to be freely and swingingly rotatable. The desired effect will not occur, however, for agricultural fields running along a slope.

In order to constantly control to a defined spacing, the spacing between the top surface of the growth for agricultural fields running in any plane and the spray nozzles arranged on a spray boom pivotably suspended about a central pivot point, it is therefore known to pivot the spray boom, which is, for instance, raised to a desired spacing from the ground, about a pivot axis running through a central pivot point such that the spacing is optimized over the entire working width. For this purpose, an alignment changing torque has to be exerted on the spray boom about a pivot axis running through a central pivot point. This is carried out by means of at least one actuator, which transmits, at least as required, a force or a force couple effecting an alignment changing torque about a pivot axis from the carrier vehicle onto the spray boom in order to change the alignment of the spray boom.

This alignment changing torque accelerates the spray boom in a desired target rotational direction. Without countermeasures, the spray boom would continue to rotate about the pivot axis even after the impact of the alignment changing torque has ended, since the spray boom would retain its angular momentum due to the mass moment of inertia. In order to decelerate the spray boom, a braking torque in opposite to the previous alignment changing torque therefore has to be induced. This braking torque counteracts the rotary movement initiated by the alignment changing torque and thus damps the system of the spray boom rotatably suspended about the central pivot point.

Up to now, mechanical dampers, which are arranged between the carrier vehicle and the spray boom, are usually used for generating the braking torque. Assuming that a relative movement in the form of a rotation about the pivot axis occurs between the carrier vehicle and boom, then a mechanical damper mounted in between would counteract the relative rotation or the rotary movement, respectively, of the boom and would decelerate it as desired. If the carrier vehicle, however, rotates about the pivot axis due to bumps, for example, and the spray boom stands still, this will also result in a relative rotation between the carrier vehicle and the spray boom. A mechanical damper arranged between the carrier vehicle and the spray boom would counteract this relative rotation and thus transmit a torque acting about the pivot axis to the spray boom, such that a coupling exists between carrier vehicle and spray boom.

The coupling likewise exists if a measuring system is used as a basis for regulating the torque, which measuring system measures a relative angle and/or a relative rotation between carrier vehicle and spray boom.

In addition, measuring systems are known, which use tilt sensors arranged at the spray boom for determining the position of the spray boom. The angular velocity of the spray boom can be acquired independently of the carrier vehicle from the temporal derivation of the tilt. In the instance of lateral accelerations such as occur, for example, when driving along curves, tilt sensors however provide an incorrect tilt. An incorrect angular velocity will therefore also be calculated.

A spreading device for spreading liquid active agents is known from US 2011/0282554 A1. The device comprises:
- a carrier vehicle;
- a spray boom arranged on the carrier vehicle, the spray boom comprising a middle part, which is variably adjustable in its spacing from the ground, as well as two cantilevers projecting laterally from the carrier vehicle, which cantilevers are arranged on the middle part to be movable independently of each other about a respective pivot axes running parallel to a longitudinal axis of the carrier vehicle;
- distance sensors arranged on the two cantilevers for the purpose of detecting the positions or distances of the cantilevered ends to the ground;
- at least one distance sensor arranged on the middle part between the cantilevers for the purpose of detecting the distance of the middle part to the ground;

a control unit processing the output signals of the sensors to control signals;

one actuator respectively acting on one of the two cantilevers, the actuator being in the form of a hydraulic cylinder and having the purpose of individually lifting and lowering each cantilevered end in dependence on control signals from the control unit; as well as an angle of rotation sensor or an angular rate sensor, which detects the roll angle or the roll rate of the carrier vehicle about its longitudinal axis and which is arranged on the carrier vehicle independently of the spray boom.

The distance sensors can be LIDAR (Light Detection and Ranging), RADAR (RAdio Detection and Ranging), or ultrasonic sensors, or they can be sensors based on interferometry or on radio frequency, such as, for example, GPS sensors. The angle of rotation sensor or the yaw rate sensor can be a gyroscope. In order to maintain the cantilevered ends at the uniform distance to the ground like the middle part, a vertical error of the two cantilevered ends is first calculated by way of a comparison of the output signals of the distance sensors. If this vertical error is not equal to zero for one or for both cantilevered ends, an initial control signal is generated in order to actuate an actuator assigned to a cantilever in question and to reset the cantilevered end having a vertical error to the specified spacing from the ground. If one of the cantilevers is lifted in the process, this leads to a rolling movement of the carrier vehicle in the direction toward the cantilever to be lifted, whereby, without further measures, the remaining cantilever would have a vertical error resulting from a lowering. In order for a control loop comprised of distance sensors, control unit, and actuators, to be regulation-technically stable and to not build up uncontrollable sway, for instance, and/or to not lead to a lateral toppling of the carrier vehicle, it is provided by means of the control unit to generate a compensation control signal counteracting an instability of the control loop by way of the output signal of the angle of rotation sensor or the yaw rate sensor, which detects the roll angle or the roll rate of the carrier vehicle about its longitudinal axis, and to output to the actuators a control signal determined by way of the initial control signal and the compensation control signal.

A spreading device for spreading liquid active agents is also known from WO 2012/146255 A1. The device comprises:

a carrier vehicle;

a spray boom with cantilevers projecting on both sides of the carrier vehicle, which spray boom is arranged on the carrier vehicle movably about a pivot axis running parallel to a longitudinal axis of the carrier vehicle;

one or more sensors arranged on the spray boom for the purpose of detecting the distances of the cantilevers to the ground, such as one or more acceleration sensors, gyroscopes, and/or distance sensors;

a control unit processing the output signals of the one or more sensors to control signals;

a stabilizing device, which damps vibrations of the spray boom, the stabilizing device comprising two guidings running along the two cantilevers as well as one block arranged to be shiftable along each of the guides; and an actuating device, which acts on the positions of the two blocks along the guides in dependence on control signals from the control unit.

As a reaction to undesirable vertical movements, which, in an undampened control loop, can induce rotary oscillations of the spray boom about the longitudinal axis of the carrier vehicle, a damping and compensation by a mass displacement by way of a shift of the blocks along the two cantilevers is provided. Output signals from acceleration sensors, which are fastened at the cantilevers and which detect vertical oscillations of the spray boom, serve as input variable from the control unit, which input variable enters into the control signals to the actuating device. A regulation of the uniform distance of the cantilevers to the ground is not disclosed.

A spreading device for spreading liquid active agents is known from DE 10 2007 045 846 A1. The device comprises:

a carrier vehicle;

a spray boom mounted on a height adjustable parallelogram linkage on the carrier vehicle, which spray boom is movable about a rotation axis running parallel to a longitudinal axis of the carrier vehicle;

an acceleration sensor arranged on the spray boom;

an acceleration sensor arranged on the parallelogram linkage; as well as a first reference sensor in the form of an acceleration sensor, which is arranged at the carrier vehicle; and a second reference sensor in the form of a gyrostat or a yaw rate sensor, which is arranged in the area of the frame of the carrier vehicle;

a control unit processing the output signals of the one or more sensors to control signals;

an actuator in the form of a hydraulic cylinder, which acts on the angular position of the spray boom in dependence on control signals from the control unit; as well as an actuator in the form of a hydraulic cylinder, which acts on the distance of the parallelogram linkage from the ground in dependence on control signals from the control unit.

Once position and alignment of the spray boom have been manually set, the control signals generated by the control unit prevent position changes when braking or accelerating, during bounding or rebounding, respectively, of the carrier vehicle, or also when driving over bumps. Errors creeping in by way of the different positioning of the acceleration sensors and the reference sensors can be compensated more precisely by the reference sensors. Regulation of the uniform spacing of the spray boom to the ground is not disclosed.

For the sake of completeness, it should be mentioned that, in addition, spray booms are known that consist of segments, which are adjustable relative to one another, in order to allow for a sectional adaptation to the ground contour in the instance of very wide working widths. A spray boom which has a cantilever that is put together of segments is already known from DE 32 02 569 A1. In this instance, individual segments are connected to each other, with the movement of the individual segments in relation to each other being carried out passively. For this mechanism, a supporting element is necessary on the outer side of each of the cantilevers in order to enable the pivoting process.

SUMMARY

The object of the invention is to develop a device, such as, for instance, a field sprayer, for spreading liquid and/or solid active agents with a carrier vehicle and at least one boom with cantilevers projecting on both sides of the carrier vehicle, which boom is arranged pivotably about at least one rotation axis running preferably in parallel to a longitudinal axis of the carrier vehicle, which device enables maintaining as precisely as possible the spacing of the cantilevers in relation to the ground surface, also in the instance of uneven ground and a moving or rolling carrier vehicle, as well as specifying a method for controlling such a device, by means of which method it is made possible to maintain as precisely as possible the spacing of the cantilevers in relation to the ground surface, also in the instance of uneven ground and a moving or rolling carrier vehicle.

The task is respectively solved by the features of the independent claims.

Features of further advantageous developments of the invention are indicated in the dependent claims, in the following section with the general description, in the figures as well as in the corresponding section including the description of the figures.

A first object of the invention thus relates to a device for spreading liquid and/or solid active agents. The device comprises:
- a carrier vehicle;
- at least one boom, such as, for instance, a spray boom, with cantilevers projecting on both sides of the carrier vehicle, which boom is arranged pivotably about at least one pivot axis running preferably in parallel to a longitudinal axis of the carrier vehicle, as well as, arranged thereat, spreading means, which are connected and/or connectable to a reservoir for at least one liquid and/or solid agent, such as for instance, spray nozzles, which are connected and/or connectable to a spraying agent tank;
- at least one sensor arrangement for detecting an angular velocity of the boom about the pivot axis in relation to a reference plane;
- at least one sensor arrangement for detecting an angular position of the boom about the pivot axis in relation to the reference plane;
- a control unit processing output signals of the sensor arrangements to control signals;
- at least one actuating means, also called an actuator, for instance, in the form of one or more hydraulic cylinders, which controls the angular position of the boom about the pivot axis in relation to the carrier vehicle based on control signals from the control unit, and which converts control signals to mechanical motion or to another physical quantity, such as, for instance, pressure, and thus produces a force, which exerts a torque on the boom or a force couple, which exerts a torque on the boom;

where, for the purpose of determining an angular position of the boom about the pivot axis in relation to an initial alignment corresponding, for instance, to the reference plane, the control unit:
- calculates the angular position of the boom in relation to the reference plane by temporal integration of the angular velocity, whereby, on the one hand, neither the carrier vehicle nor translational accelerations interfere with the calculation of the angular position, however, on the other hand, measurement errors are also integrated and cause a drift of the angular position, hereafter termed angle drift; and
- for the purpose of compensating the angle drift, merges the angular position of the boom, calculated by way of the angular velocity, with the detected angular position of the boom in order to determine the present angular position of the boom in relation to the reference plane and in order to generate a control signal therefrom, which returns the boom from its present angular position to a desired angular position in relation to the reference plane.

A pivot angle expressing an angular position of the boom in relation to the reference plane is obtained by temporal integration of the angular rate, termed as angular velocity. Disturbances caused by the carrier vehicle or by translational accelerations have no influence on the calculation in this context, whereas measuring errors are likewise integrated and cause an angle drift of the pivot angle.

Although measurement of the angular position in relation to the reference plane, for instance, by measurement of the relative rotation between carrier vehicle and boom or measurement of a tilt angle relative to the acceleration of gravity, has the disadvantage of influences from disturbances caused by rotary movements of the carrier vehicle or by translational accelerations such as occur when driving along curves, for example, this is offset by the advantage that this type of detection of the angular position is not subject to any angle drift.

By merging the calculated angular position and the measured angular position, referred to as the detected angular position, the present angular position in relation to the reference plane is determined very precisely, with only the advantages of each of the measuring methods being used and without having to put up with their disadvantages.

The advantage, as compared to the prior art, lies in obtaining a measuring system consisting of the at least one sensor arrangement for the detection of an angular velocity of the boom about the rotation axis in relation to a reference plane, at least one sensor arrangement for the detection of an angular position of the boom about the rotation axis in relation to the reference plane, and a control unit processing the output signals of the sensor arrangements to control signals, which measuring system expresses the present angular position and rotary movements of the boom in relation to the reference plane independently of the carrier vehicle and which generates control signals therefrom for the regulation of a constant alignment of the boom in relation to the reference plane. Two measuring systems, which are based on different physical principles, are used and merged for the determination of the present angular position. Thereby, the disadvantages of each of the measuring methods are suppressed.

The at least one sensor arrangement for the detection of an angular velocity of the boom about the rotation axis in relation to the reference plane can comprise an angular rate sensor, which detects the angular velocity of the boom.

In this context, an angular rate sensor is employed for the detection of the angular velocity, which angular rate sensor is mounted directly on the boom. Rotary movements of the carrier vehicle thus have no influence on determining the angular velocity of the boom. An output signal of an angular rate sensor, which output signal is proportional to the measurand or reflects it, thus corresponds to the rotary movement of the boom in relation to any optional reference plane, for instance, in relation to the surface of the earth or orthogonal to the acceleration of gravity, respectively, or in relation to a long-term alignment of the carrier vehicle reflecting an averaged ground profile.

This measurand or an output signal, respectively, of an angular rate sensor detecting angular velocities of the boom, which output signal is integrated into the control signals for the actuator or actuators and serves as an input variable for the control unit, and which output signal is proportional to this measurand or reflects it, can be used for the purpose of obtaining an active damping of the boom in the form of an actively induced brake torque.

Alternatively or additionally, the at least one sensor arrangement for the detection of an angular velocity of the boom about the rotation axis in relation to a reference plane can comprise at least one angular rate sensor arranged on the carrier vehicle for the purpose of measuring angular velocities of the carrier vehicle at least about its longitudinal axis and thus measuring rotary movements representing disturbances of the carrier vehicle.

Additionally, the at least one sensor arrangement for the detection of an angular velocity of the boom about the rotation axis in relation to a reference plane can in this instance comprise at least one angle of rotation sensor or rotational angular velocity sensor, which detects the relative rotation between carrier vehicle and boom, such that the absolute angular velocity of the boom about the rotation axis can then be determined from the two measured values of the angular velocity of the carrier vehicle in relation to its longitudinal axis and relative rotation between carrier vehicle and boom.

Alternatively or in addition to an angular rate sensor, the at least one sensor arrangement for the detection of an angular velocity of the boom about the rotation axis in relation to a reference plane can comprise an angular acceleration sensor. A measure for the angular velocity can be obtained by temporal integration of this sensor output signal.

Alternatively or in addition to an angular rate sensor and/or to an angular acceleration sensor, the at least one sensor arrangement for the detection of an angular velocity of the boom about the rotation axis in relation to a reference plane can typically comprise at least two acceleration sensors arranged in the area of the cantilevers of the boom, for instance, at their ends. It should be mentioned here, however, that one sensor may already suffice, which can be arranged in the area of one of the cantilevers of the boom, for example, at an end. The output signal of that sensor or the output signals of a plurality of sensors reflect the translational accelerations at the ends of the cantilevers. The difference between the output signals from two acceleration sensors arranged at the opposite ends of the cantilevers multiplied by the boom width results in the angular accelerations, by the temporal integration of which the angular velocity is in turn obtained.

In summary, it is thus obvious that the means for determining an angular velocity of the boom about the rotation axis in relation to a reference plane can comprise one or a plurality of inertial sensors arranged at the boom.

Inertial sensors serve for measuring accelerations and angular rates. By combining a plurality of inertial sensors in an inertial measurement unit, also termed "IMU", accelerations can be measured in up to six degrees of freedom that a rigid body can have (three translational and three rotational degrees of freedom). An IMU is the main component of an inertial navigation system, also termed INS.

Examples of inertial sensors are acceleration sensors and angular rate sensors.

An angular rate sensor detects the rotational speed or angular velocity, respectively, of a body about a specified rotation axis or pivoting axis, with an output signal of an angular rate sensor being preferably uniquely proportional to a detected angular velocity.

By integration of the angular velocity over a time interval, it is possible to derive the angle by which the body has rotated in that time interval. The angular rates about the three spatial axes are termed as:
- yaw rate (rotation about the vertical axis),
- pitch rate (rotation about the lateral axis), and
- roll rate (rotation about the longitudinal axis).

The measuring principle is essentially based on two measuring principles, on the one hand on the Coriolis force, which acts on a mechanically moving system, and on the other hand the Sagnac effect, which can be observed with light.

Examples of mechanical, moving systems using the Coriolis force are:
- Foucault pendulum;
- gyrocompass;
- dynamically tuned gyroscope (DTG), measurement error <1°/h,
- vibrating structure gyroscope, measurement error <10°/h; and
- halteres.

Examples of optical systems using the Sagnac effect are:
- ring laser gyroscope (RLG), measurement error <0.001°/h;
- fiber optic gyroscope (FOG), measurement error <1°/h.

As a rule, inertial measurement units contain the following sensor types:
- Three orthogonally arranged acceleration sensors (also termed translational sensors) detect the linear acceleration in the x or y or z axis, respectively. From this, the translational movement can be calculated by double integration.
- Three orthogonally arranged angular rate sensors (also termed gyroscopic sensors) measure the angular velocity about the x or y or z axis, respectively. From this, the rotational motion can be calculated by single integration.

Magnetic field sensors, for instance, such as compass sensors, can be additionally provided for determining the constant of integration and/or for improving the accuracy and/or and or for correcting a drift of the sensors, and/or for receiving signals from an existing and/or future global navigation satellite system, also abbreviated as GNSS, such as:
- GPS (Global Positioning System) of the United States of America, and/or
- GLONASS (GLObal NAvigation Satellite System) of the Russian Federation, and/or
- Galileo of the European Union, and/or
- BeiDou of the People's Republic of China.

The at least one sensor arrangement for the detection of an angular position of the boom about the rotation axis in relation to the reference plane can comprise at least one sensor, which detects a relative rotation between carrier vehicle and boom in relation to the rotation axis.

At least one sensor for the detection of a relative rotation between carrier vehicle and boom can be an angle of rotation sensor arranged between the boom and the carrier vehicle.

Alternatively or additionally, detection of a relative rotation between the carrier vehicle and boom can be realized by way of at least one tilt sensor, which detects an angle between the carrier vehicle and the reference plane, and by way of at least one tilt sensor which detects an angle between the boom and the reference plane, where the difference of the angle between the carrier vehicle and the reference plane and the angle between the boom and the reference plane, as detected by the sensors, is proportional to the relative rotation between carrier vehicle and boom.

By merging the angular position of the boom, which angular position is calculated by means of a sensor-detected angular velocity, with the relative rotation between carrier vehicle and boom, which relative rotation is sensor-detected directly by means of an angle of rotation sensor or indirectly by subtraction of the tilt of the boom and of the carrier vehicle in relation to the reference plane, it is possible to take reference to a reference plane corresponding to a long-term alignment of the carrier vehicle and reflecting an averaged ground profile.

The at least one sensor arrangement for the detection of an angular position of the boom about the rotation axis in relation to the reference plane can alternatively or additionally comprise at least one tilt sensor detecting an angle between the boom and the reference plane.

By merging the angular position of the boom, which angular position is calculated by way of an angular velocity, with an angular position of the boom, which angular position is detected by way of the detection of an angle between the boom and the reference plane, it is possible to take reference to a reference plane corresponding to an artificial horizon.

Tilt sensors do have the disadvantage of being associated with lateral accelerations. This disadvantage is, however, compensated by merger with the angular position of the boom, which angular position is calculated by way of an angular velocity.

In summary, the reference plane can be either an artificial horizon, where the at least one sensor arrangement for the detection of an angular position of the boom about the rotation axis in relation to a reference plane preferentially comprises a tilt sensor, or the reference plane can be a long-term alignment of the carrier vehicle, where the at least one sensor arrangement for the detection of an angular position of the boom about the rotation axis in relation to a reference plane preferentially comprises detection of a relative rotation between the carrier vehicle and boom, for instance, by way of an angle of rotation sensor, which detects the angle between the boom and carrier vehicle.

For the purpose of determining the present angular position of the boom about the rotation axis in relation to the reference plane by way of merging the angular position of the boom, which is calculated by way of an angular velocity, with the angular position of the boom, which is sensor-detected directly or indirectly by subtraction, the control unit is preferably provided with means for carrying out a Kalman filtering.

For the determination of the present angular position of the boom about the rotation axis in relation to the reference plane by way of merging the angular position of the boom, which angular position is calculated by way of an angular velocity, with the angular position of the boom, which is sensor-detected directly or indirectly by subtraction, the control unit can alternatively or additionally be equipped with means for the low-pass filtering of the sensor-detected angular position as well as with means for the comparison of the low-pass filtered, sensor-detected angular position under continuous zero balance with the angular position, which is calculated by way of an angular velocity in order to compensate the angle drift.

The control unit regulates and/or controls the angular position of the boom about the rotation axis along the driving direction of the carrier vehicle by means of at least one actuator, which comprises, for instance, at least one hydraulic cylinder.

The control unit can allow for a manual operating mode, in which the actuator, which acts on the angular position of the boom about the rotation axis in relation to the carrier vehicle, performs no active control and the boom is guided, for instance, nearly actuating power-free.

In the manual operating mode, at least a part of the boom, for instance, at least a middle part, which is arranged between the cantilevers, follows the motion of the carrier vehicle as seen over a longer period of time, since the carrier vehicle basically follows the field relief and thus the contour of the field.

High frequency rolling movements of the carrier vehicle, however, should have no influence on the angular position of the boom in relation to a long-term alignment of the carrier vehicle or to a reference plane corresponding to an artificial horizon.

The control unit moreover allows for an automatic operating mode, in which the actuator carries out an active motion, in order to thus adapt the angular position of the boom in relation to the reference plane.

The invention allows a very accurate determination of a present angular position of the boom in relation to a reference plane. In comparison to determining the angular position by way of a plurality of ultrasonic sensors, this is less elaborate and less cost-intensive.

In addition, the device can comprise an actuator influencing an average distance of the boom in relation to the ground or to the growth in dependence on control signals from the control unit, for instance, in the form of one or a plurality of hydraulic cylinders, which actuator converts control signals into mechanical motion or another physical quantity, such as, for instance, pressure, and thus exerts a force on the boom, which force raises or lowers the boom. Instead of the hydraulic cylinder, other suitable actuators can generally also be employed, for example, pneumatic, electromechanical, or electromotive actuators.

Furthermore, the device can comprise at least one sensor arrangement for detecting at least one average distance of the boom in relation to the ground or to the growth. Preferably, such a sensor arrangement typically comprises at least one distance sensor arranged at one end of a cantilever of the boom. By means of these distance sensors, which are arranged at the ends of the cantilevers of the boom, and by means of an appropriate consideration of their output signals in producing control signals by means of the control unit, it is possible to increase the reliability with which it can be prevented that the boom or spreading means for solid and/or liquid active agents arranged thereat, such as, for instance, spray nozzles, come into contact with the ground and/or with the growth. It should be noted that the sensor arrangement can optionally comprise only one single distance sensor at one end of one of the cantilevers of the boom. By means of such a distance sensor, which is arranged at one end of one of the cantilevers of the boom, and by an appropriate consideration of its output signal in producing control signals by means of the control unit, it is possible to increase the reliability with which it can be prevented that the boom or spreading means for solid and/or liquid active agents arranged thereat, such as, for instance, spray nozzles, come into contact with the ground and/or with the growth.

Alternatively or additionally, such a sensor arrangement can comprise at least one distance sensor arranged at the part of the boom not projecting beyond the width of the carrier vehicle.

By way of the distance signals of the sensors, the control unit can produce control signals provided at least for the actuator to influence at least one average distance of the boom in relation to the ground or to the growth.

In order to exclude influences from uneven mass distributions of the boom as far as possible, the rotation axis preferably runs through the center of gravity of the boom.

The at least one boom can be arranged on the carrier vehicle in a permanent manner or so as to be exchangeable for another apparatus for agricultural soil treatment and/or growth treatment.

In this context, the carrier vehicle can be driven or towed such that the device:
- forms a self-propelled agricultural unit or an agricultural self-drive unit, respectively, in the instance of a driven carrier vehicle with permanently arranged boom;
- forms a towed agricultural unit, such as, for instance, an agricultural trailer, in the instance of a towed carrier vehicle with permanently arranged boom; and
- forms either an attachment unit or a mounting unit in the instance of a driven carrier vehicle with a boom that is arranged so as to be exchangeable for another apparatus for agricultural soil treatment and/or growth treatment, for instance at a three-point hitch or on a loading platform provided for this purpose.

Additional advantages in comparison with prior art over and above those already mentioned will result from completely solving the proposed task together with the remedy of any disadvantages of prior art.

Moreover, it is reliably prevented that the cantilevers come into contact with the ground by precisely maintaining the distances of the cantilevers in relation to the ground surface and/or to the growth, independent of the moving and/or rolling carrier vehicle.

A second object of the invention relates to a method for controlling a previously described device by way of regulation of the angular position of the boom of the device, which is arranged on the carrier vehicle to be movable about a rotation axis based on a present angular position, where the following is provided for the purpose of determining the present angular position:
- to detect an angular velocity of the boom about the rotation axis in relation to a reference plane;
- to detect an angular position of the boom about the rotation axis in relation to a reference plane;
- to calculate the angular position of the boom in relation to the reference plane by temporal integration of the angular velocity, whereby, on the one hand, neither the carrier vehicle of the device nor translational accelerations interfere with the calculation of the angular position, however, on the other hand, measurement errors are also integrated and cause a drift of the angular position, hereafter referred to as the angle drift; and
- to merge, for the purpose of compensating the angle drift, the angular position of the boom, which angular position is calculated by way of the angular velocity, with the detected angular position of the boom for the purpose of determining the present angular position of the boom in relation to the reference plane.

By merging the calculated angular position and the measured angular position, referred to as the detected angular position, the present angular position in relation to the reference plane is determined very precisely, with only the advantages of each of the measuring methods being used and without having to put up with their disadvantages.

The method preferentially provides merging the angular position of the boom in relation to the reference plane, which angular position is calculated by way of the angular velocity, with the angular position of the boom in relation to the reference plane, which angular position is detected independently of the angular velocity, in order to generate a control signal, which returns the boom from its present angular position to a desired angular position in relation to the reference plane.

The method can provide for detecting the angular velocity by way of an angular rate sensor, which is arranged on the boom and which detects the angular velocity of the boom.

In this context, an angular rate sensor is employed for the detection of the angular velocity, which angular rate sensor is mounted directly on the boom. Rotary movements of the carrier vehicle thus have no influence on determining the angular velocity of the boom. An output signal of an angular rate sensor, which output signal is proportional to the measurand or reflects it, thus corresponds to the rotary movement of the boom in relation to any optional reference plane, for instance, in relation to the surface of the earth or orthogonal to the acceleration of gravity, respectively, or in relation to a long-term alignment of the carrier vehicle reflecting an averaged ground profile.

This measurand or an output signal, respectively, of an angular rate sensor detecting angular velocities of the boom, which output signal is integrated into the control signals and which output signal is proportional to this measurand or reflects it, can be used for the purpose of obtaining an active damping of the boom in the form of an actively induced brake torque.

Additionally or alternatively, a method can be provided to detect the angular velocity of the boom by way of the angular velocity of the carrier vehicle about its longitudinal axis, which runs parallel to the rotation axis, along with the relative rotation between the carrier vehicle and boom such that the absolute angular velocity of the boom about the rotation axis can then be determined from the two measured values of the angular velocity of the carrier vehicle in relation to its longitudinal axis and relative rotation between the carrier vehicle and boom.

For this purpose, it can be provided to locate an angular rate sensor on the carrier vehicle of the device in order to detect the angular velocity of the carrier vehicle about its longitudinal axis, which angular velocity is also referred to as the roll rate, and to provide an angle of rotation sensor or a rotational angular velocity sensor between the carrier vehicle and boom.

As an alternative or in addition, it can be provided to detect an angular acceleration and to obtain the angular velocity by temporal integration.

Alternatively or additionally, it can be provided to detect translational accelerations in the area of the cantilevers of the boom, preferably at the oppositely positioned ends of the cantilevers, and to first calculate the angular acceleration of the boom by way of a difference between the translational accelerations at the oppositely positioned ends of the cantilevers and to then in turn calculate the angular velocity by temporal integration.

In addition to or instead of the previous exemplary embodiments, which comprise detection of the relative rotation between the carrier vehicle and boom, the method can provide to detect the relative rotation between the carrier vehicle and boom by way of the difference between the angular position of the boom about the rotation axis in relation to a reference plane and the angular position of the carrier vehicle about its longitudinal axis in relation to the reference plane, which longitudinal axis runs parallel to the rotation axis, where the difference of the angle between the carrier vehicle and the reference plane, which angle is detected by the sensors, and the angle between the boom and the reference plane is proportional to a relative rotation between the carrier vehicle and boom. For the detection of the angular position of the boom about the rotation axis in relation to a reference plane and of the angular position of the carrier vehicle about its longitudinal axis in relation to the reference plane, which longitudinal axis runs parallel to the rotation axis, tilt angle sensors can be provided respectively at the boom and at the carrier vehicle, which tilt angle sensors detect tilt angles between the boom and the vertical and/or the horizontal or between the carrier vehicle and the vertical and/or the horizontal, respectively.

By merging the angular position of the boom, which angular position is calculated by way of a detected angular velocity, with a calculated and/or detected relative rotation between carrier vehicle and boom, the method can provide for taking reference to a reference plane corresponding to a long-term alignment of the carrier vehicle and reflecting an averaged ground profile.

For the detection of an angular position of the boom about the rotation axis in relation to a reference plane, the method can provide for detecting a tilt angle, which reflects an angle between the boom and the reference plane, by means of a tilt sensor, for instance.

By merging the angular position of the boom, which angular position is calculated by means of an angular velocity, with an angular position of the boom, which angular position is detected by the detection of an angle between the boom and the reference plane, it is possible to take reference to a reference plane corresponding to an artificial horizon.

For the purpose of determining the present angular position of the boom about the rotation axis in relation to the reference plane by way of merging the angular position of the boom, which is calculated by means of an angular velocity, with the angular position of the boom, which is detected directly or indirectly by subtraction, the method can provide to carry out a Kalman filtering.

For determining the present angular position of the boom about the rotation axis in relation to the reference plane by way of merging the angular position of the boom, which angular position is calculated by way of an angular velocity, with the angular position of the boom, which is detected directly or indirectly by subtraction, the method can alternatively or additionally provide for carrying out a low-pass filtering of the detected angular position as well as a comparison of the low-pass filtered, detected angular position under continuous zero balance with the angular position, which is calculated by way of an angular velocity in order to compensate the angle drift.

The method allows utilizing all advantages of the described device.

Besides the use in connection with a previously described device for spreading liquid and/or solid active agents, the method is suitable for the use with any devices for agricultural ground and/or growth treatment, which, for the purpose of protecting the ground or the growth, dispense from equipment that is supported on the ground, but where nevertheless a high precision is required for guiding in a specified angular position, for instance, in perpendicular or in parallel to the ground.

Both the apparatus and the method can alternatively or additionally have individual or a combination of a plurality of features initially described in connection with the prior art and/or in one or a plurality of documents mentioned regarding the prior art.

Moreover, the apparatus can alternatively or additionally have individual or a combination of a plurality of features previously described in connection with the method, as well as the method can alternatively or additionally have individual or a combination of a plurality of features previously described in connection with the apparatus.

It is to be understood that the regulation of the spray boom can be realized by means of at least one inertial sensor, such as, for instance, an angular rate sensor, such as a gyroscope, which is provided at or in the spray boom and/or at or in a part of the spray boom, for example at or in a middle part. The inertial sensor detects an effective angular velocity of the spray boom and/or of a part of a spray boom independently of a motion of the carrier vehicle. On the basis of the detected angular velocity, an active damping and/or regulation is carried out. An actual angle of twist, which is termed angular position in relation to a reference plane, can be calculated by means of a temporal integral over the angular velocity.

The angular position of the spray boom and/or of a part of a spray boom relative to the carrier vehicle is additionally detected by means of an angle sensor, a rotary encoder, for instance, whereby the absolute angular position of the spray boom or of the part of the spray boom in relation to the carrier vehicle is determined.

By merging the sensor data angular velocity or angular rate, respectively, and absolute angular position or angular position, respectively, which sensor data are obtained by way of the output signals of the sensors, and by an appropriate filtering, for instance, by means of a Kalman filter, it is possible to guide the spray boom or the part of the spray boom which is provided with an inertial sensor, along with the carrier vehicle without high frequency rolling movements disturbing the position and alignment of the spray boom or of the part of the spray boom.

Possible alternatives to an angular rate sensor in the form of a gyroscope, for instance, are one or more angular acceleration sensors or symmetrically arranged angular acceleration sensors, of which the output signals are integrated. If, for instance, two symmetrically arranged angular acceleration sensors are provided in different directions, it is possible to detect the angular acceleration in one direction by way of the angular accelerations of the one or of the other angular acceleration sensor, respectively, and to calculate the angular velocity in the corresponding direction by a temporal integral over the detected angular acceleration.

In summary, the invention thus provides for referencing the present position of the boom to a reference plane in order to be able to regulate the angular position of the boom or in order to be able to regulate the boom to a defined angle, respectively, independently of the motion of the carrier vehicle. This reference plane can be a plane running orthogonal to the direction of acceleration of gravity, or it can correspond to a long-term alignment of the carrier vehicle.

For this purpose, the invention provides for merging two measuring signals, which are obtained by way of mutually independent measuring methods, a calculated angular position of the boom on the one hand, and an angular position of the boom, which angular position is measured or detected, respectively, to a merged control signal or measuring signal, respectively.

The merged measuring signal represents the present angular position of the boom in relation to a reference plane corresponding to a rotation angle between the boom and the reference plane. The reference plane, in this instance, preferably corresponds to an artificial horizon or to a long-term alignment of the carrier vehicle. The result is insensitive to rotatory and translational motions of the carrier vehicle and is not subjected to any angle drift. Furthermore, this merged measuring signal is also non-lagging in relation to the actual rotary movement and thus excellently suited for a regulation that is not undesirably coupled, in particular not high-frequency coupled, to the carrier vehicle.

It is important to point out that the arrangement of the boom at the carrier vehicle, which arrangement is pivotable about at least one rotation axis running preferably parallel to the longitudinal axis of the carrier vehicle, comprises both an arrangement of a boom, which is in itself rigid or articulated, which arrangement is pivotable about at least one rotation axis running preferably parallel to the longitudinal axis of the carrier vehicle, and also an arrangement, which is pivotable about at least one rotation axis running preferably parallel to the longitudinal axis of the carrier vehicle, and which arrangement is an arrangement of two cantilevers of a boom, which are each arranged at the carrier vehicle or at a boom middle part pivotably about respective rotation axes running preferably parallel to the longitudinal axis of the carrier vehicle. The invention and its advantages will be explained in further detail in the following passages by means of exemplary embodiments, which are illustrated in the figures. The size ratios of the individual elements do not necessarily reflect the real size ratios in the figures. It is to be understood that in some instances various aspects of the invention may be shown exaggerated or enlarged in relation to other elements to facilitate an understanding of the invention. The same or equivalent elements of the invention are designated by identical reference characters. Furthermore and for the sake of clarity, only the reference characters relevant for describing the respective figure are provided. It should be understood that the detailed description and specific examples of the transfer case according to the invention are intended for purposes of illustration only and are not intended to limit the scope of the invention.

BRIEF DESCRIPTION OF DRAWINGS

The schematic illustrations show as follows:

FIG. 2 shows an isometric view of a boom of a device for spreading liquid and/or solid active agents.

FIG. 3 shows a perspective detailed view of an arrangement of a boom of a device for spreading liquid and/or solid active agents, which arrangement is pivotable about a rotation axis running preferably in parallel to a longitudinal axis of the carrier vehicle.

FIG. 4 shows a front view of a boom of a device for spreading liquid and/or solid active agents.

FIG. 5 shows a detailed view of an arrangement of a boom of a device for spreading liquid and/or solid active agents in a front view, which arrangement is pivotable about a rotation axis running preferably in parallel to a longitudinal axis of the carrier vehicle.

DETAILED DESCRIPTION

Figure 1:
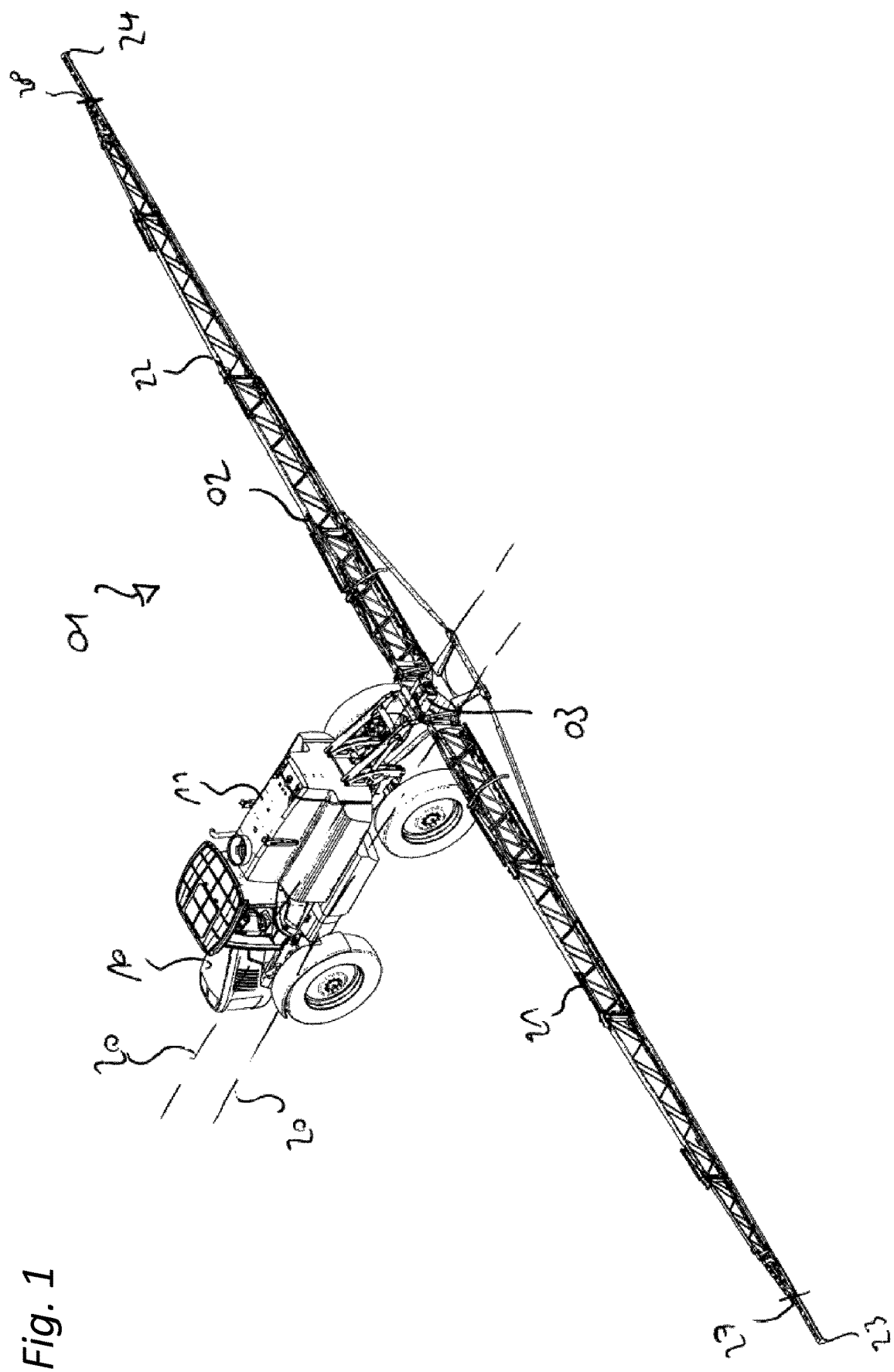
FIG. 1 shows a perspective view of a device for spreading liquid and/or solid active agents, which device is designed as a self-propelled field sprayer.
Figure 6:
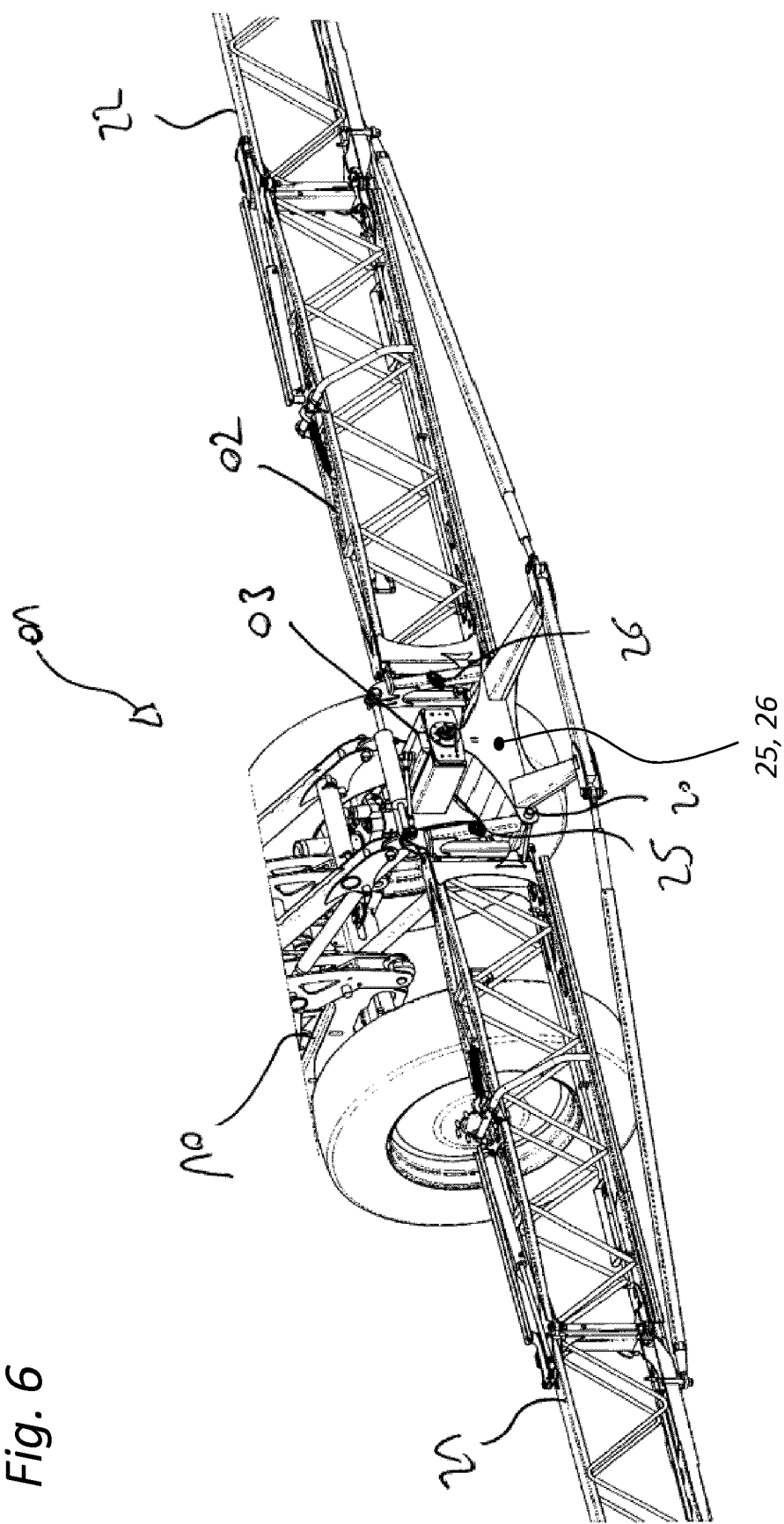
FIG. 6 shows a detailed view of a part of a device for spreading liquid and/or solid active agents in a perspective view representing an arrangement of a boom of a device for spreading liquid and/or solid active agents, which arrangement is pivotable about a rotation axis running preferably in parallel to a longitudinal axis of the carrier vehicle.

A device 01 for spreading liquid and/or solid active agents as shown entirely or in parts in FIG. 1, FIG. 2, FIG. 3, FIG. 4, FIG. 5, FIG. 6, comprises:
- a carrier vehicle 10;
- at least one boom 02, such as, for instance, a spray boom, with cantilevers 21, 22 projecting on both sides of the carrier vehicle 10, which boom 02 is arranged pivotably about at least one rotation axis 20 running preferably in parallel to a longitudinal axis of the carrier vehicle 10, as well as, arranged thereat, spreading means, which are connected and/or connectable to a reservoir 11 for at least one liquid and/or solid agent, such as for instance, spray nozzles, which are connected and/or connectable to a spraying agent tank;
- at least one sensor arrangement for the detection of an angular velocity of the boom or of parts of the boom 02, such as, for instance, its cantilevers 21, 22 about the at least one rotation axis 20 in relation to a reference plane;
- at least one sensor arrangement for the detection of an angular position of the boom 02 about the rotation axis 20 in relation to the reference plane;
- a control unit processing output signals of the sensor arrangements to control signals;
- at least one actuating means, also termed actuator 03, for instance, in the form of one or more hydraulic cylinders, which actuator 03 acts on the angular position of the boom 02 about the rotation axis in relation to the carrier vehicle 10 in dependence on control signals from the control unit, and which converts control signals to mechanical motion or to another physical quantity, such as, for instance, pressure, and thus produces a force, which exerts a torque on the boom 02 or a force couple, which exerts a torque on the boom 02;

where, for the purpose of determining an angular position of the boom 02 about the rotation axis 20 in relation to an initial alignment corresponding, for instance, to the reference plane, the control unit:
- calculates the angular position alpha2 of the boom 02 in relation to the reference plane by temporal integration of the angular velocity w, whereby, on the one hand, neither the carrier vehicle 10 nor translational accelerations interfere with the calculation of the angular position, however, on the other hand, measurement errors are also integrated and cause a drift of the angular position, termed angle drift; and
- for the purpose of compensating the angle drift, merges the angular position alpha2 of the boom 02 calculated by way of the angular velocity with the detected angular position alpha1 or d_alpha1, respectively, of the boom 02 in order to determine the present angular position of the boom 02 in relation to the reference plane and in order to generate a control signal therefrom, which returns the boom 02 from its present angular position to a desired angular position in relation to the reference plane.

The at least one sensor arrangement for the detection of an angular velocity w of the boom 02 or of parts of the boom 02, such as, for example, its cantilevers 21, 22, in relation to a reference plane can comprise one or more angular rate sensors 25, 26 arranged on the boom 02 and detecting the angular velocity w of the boom 02 or of parts of the boom 02, such as, for instance, its cantilevers 21, 22, about the at least one rotation axis 20.

Preferably at least one angular rate sensor 25, 26 is employed in this context for the detection of the angular velocity, which angular rate sensor 25, 26 is mounted directly onto the boom 02, for instance at its middle part, or onto a part of the boom 02, which is arranged pivotably about its respective rotation axis 20, such as, for instance, a cantilever 21, 22 of the boom 02, which cantilever is arranged pivotably about a respective rotation axis 20. Rotary movements of the carrier vehicle 10 thus have no influence on the determination of the angular velocity of the boom 02 or of the angular velocities of parts of the boom 02. An output signal of an angular rate sensor 25, 26, which output signal is proportional to the measurand or reflects it, thus corresponds to the rotary movement of the boom 02 or of a part of the boom 02 formed, for instance, by a cantilever 21, 22, in relation to any optional reference plane, for instance, in relation to the surface of the earth or orthogonal to the acceleration of gravity, respectively, or in relation to a long-term alignment of the carrier vehicle 10 reflecting an averaged ground profile.

This measurand or an output signal, respectively, of an angular rate sensor 25, 26 detecting angular velocities of the boom 02 or of parts of the boom 02 formed by the cantilevers 21, 22, which output signal is integrated into the control signals to the actuators 03 and serves as an input variable for the control unit, and which output signal is proportional to this measurand or reflects it, can be used for the purpose of obtaining an active damping of the boom 02 in the form of an actively induced brake torque.

The at least one sensor arrangement for the detection of an angular velocity of the boom 02 or of parts of the booms 02, such as, for instance, its cantilevers 21, 22, about at least one rotation axis 20 in relation to a reference plane can comprise at least two acceleration sensors 27, 28 arranged in the area of the cantilevers 21, 22 of the boom 20, for instance, at the cantilever ends 23, 24. The output signals of the sensor arrangement reflect the translational accelerations at the ends 23, 24 of the cantilevers 21, 22. The difference between the output signals from two acceleration sensors 27, 28 arranged at the opposite ends 23, 24 of the cantilevers 21, 22 multiplied by the working width and/or boom width or with the distance, respectively, between the two acceleration sensors 27, 28, results in the angular accelerations, by the temporal integration of which the angular velocity is in turn obtained.

The at least one sensor arrangement for the detection of an angular velocity of the boom 02 or of parts of the boom 02, such as, for instance, its cantilevers 21, 22, about at least one rotation axis 20 in relation to a reference plane can alternatively comprise at least one angular rate sensor, also termed rotational angular velocity sensor, arranged at the carrier vehicle 10 for the purpose of measuring angular velocities of the carrier vehicle 10 at least about its longitudinal axis running in parallel to the at least one rotation axis 20, and thus for measuring rotary movements of the carrier vehicle 10 representing disturbances. In this context, the at least one sensor arrangement for the detection of an angular velocity of the boom 02 about the rotation axis in relation to a reference plane preferably additionally comprises at least one angle of rotation sensor or one rotational angular velocity sensor, which detects a relative rotation between carrier vehicle 10 and boom 02 or between carrier vehicle 10 and, for instance, parts of the boom 02 formed by the cantilevers 21, 22, such that the absolute angular velocity of the boom 02 or of, for instance, parts of the boom 02 formed by the cantilevers 21, 22, about the respective at least one rotation axis 20 can be determined from the two measured values of the angular velocity of the carrier vehicle 10 in relation to its longitudinal axis and of the relative rotation between carrier vehicle 10 and boom 02 or between carrier vehicle 10 and parts of the boom 02 formed by, for instance, the cantilevers 21, 22. By means of an angle of rotation sensor, the relative rotation between carrier vehicle 10 and boom 02 or the relative rotation, respectively, of parts of the boom 02 formed by, for instance, cantilevers 21, 22, which parts are each arranged at the carrier vehicle 10 to be pivotable about the respectively own rotation axes, is directly detected, whereas the relative rotation between carrier vehicle 10 and boom 02 or the relative rotation, respectively, of parts of the boom 02 formed by, for instance, cantilevers 21, 22, which parts are each arranged at the carrier vehicle 10 to be pivotable about the respective rotation axes, is indirectly detected by temporal integration of the angular velocity by way of a rotational angular velocity sensor.

The at least one sensor arrangement for the detection of an angular velocity of the boom 02 or of parts of the boom 02, such as, for instance, its cantilevers 21, 22, about at least one rotation axis in relation to a reference plane comprises an angular acceleration sensor instead of or in addition to an angular rate sensor. A measure for the angular velocity can be obtained by temporal integration of this sensor output signal.

The at least one sensor arrangement for the detection of an angular position of the boom 02 or of parts of the boom 02, such as, for instance, its cantilevers 21, 22, about the at least one rotation axis 20 in relation to the reference plane can comprise at least one sensor, which detects a relative rotation between carrier vehicle 10 and boom 02 or between carrier vehicle 10 and parts of the boom 02, such as, for instance, its cantilevers 21, 22, in relation to the at least one rotation axis 20.

The at least one sensor for the detection of a relative rotation between carrier vehicle 10 and boom 02 or between carrier vehicle 10 and parts of the boom 02, such as, for instance, its cantilevers 21, 22, can comprise:
  at least one angle of rotation sensor, which is arranged between the boom 02 or parts of the boom 02, such as, for instance, its cantilever 21, 22, and the carrier vehicle 10, and/or
  at least one tilt sensor, which detects an angle between the carrier vehicle 10 and the reference plane, and at least one tilt sensor, which detects an angle between the boom 02 or parts of the boom 02, such as, for instance, its cantilevers 21, 22, and the reference plane.

In this context, the difference between the angle sensors between the carrier vehicle 10 and the reference plane, which angle is detected by the tilt sensors and the angle between the boom 02 or parts of the boom 02, such as, for instance, its cantilevers 21, 22, and the reference plane is proportional to a relative rotation between carrier vehicle 10 and boom 02 or to a relative rotation, respectively, between carrier vehicle 10 and parts of the boom 02, such as, for instance, its cantilevers 21, 22, which are arranged pivotably about respective rotation axes 20.

By a merger of the angular position alpha2 of the boom 02 or of parts of the boom 02, such as, for instance, its cantilevers 21, 22, which are arranged pivotably about respective rotation axes 20, which angular position alpha2 is calculated by means of a sensor-detected angular velocity w, with a relative rotation d_alpha1 between carrier vehicle 10 and boom 02 or between carrier vehicle 10 and parts of the boom 02, respectively, such as, for instance, its cantilevers 21, 22, which are arranged pivotably about respective rotation axes 20, which relative rotation d_alpha1 is directly sensor-detected by means of an angle of rotation sensor or indirectly sensor-detected by subtraction of the tilt alpha_g of the boom 02 or of parts of the boom 02, such as, for instance, its cantilevers 21, 22, which are arranged pivotably about respective rotation axes 20, and the tilt alpha_t of the carrier vehicle 10 in relation to reference plane, reference can be taken to a reference plane corresponding to a long-term alignment of the carrier vehicle 10 and reflecting an averaged ground profile.

The at least one sensor arrangement for the detection of an angular position of the boom 02 or of parts of the boom 02, such as, for instance, its cantilevers 21, 22, which are arranged pivotably about respective rotation axes 20, about the rotation axis 20 in relation to the reference plane can comprise at least one tilt sensor, which detects an angle alpha_g between the boom 02 or parts of the boom 02, such as, for instance, its cantilevers 21, 22, which are arranged pivotably about respective rotation axes 20, and the reference plane.

By merging the angular position alpha2 of the boom 02 or of parts of the boom 02, such as, for instance, its cantilevers 21, 22, which are arranged pivotably about respective rotation axes 20, which angular position alpha2 is calculated by way of an angular velocity w, with an angular position alpha1 of the boom 02 or of parts of the boom 02, such as, for instance, its cantilevers 21, 22, which are arranged pivotably about respective rotation axes 20, which angular position alpha1 is detected by way of a detection of an angle alpha between the boom 02 and the reference plane or between parts of the boom 02, such as, for instance, its cantilevers 21, 22, which are arranged pivotably about respective rotation axes 20, and the reference plane, reference can be taken to a reference plane corresponding to an artificial horizon.

For the determination of the present angular position of the boom 02 or of parts of the boom 02, such as, for instance, its cantilevers 21, 22, which are arranged pivotably about respective rotation axes 20, about the at least one rotation axis in relation to the reference plane by way of merging the angular position of the boom 02 or of parts of the boom 02, such as, for instance, its cantilevers 21, 22, which are arranged pivotably about respective rotation axes 20, which angular position is calculated by way of an angular velocity, with the angular position of the boom 02 or of parts of the boom 02, such as, for instance, its cantilevers 21, 22, which are arranged pivotably about respective rotation axes 20, which angular position is sensor-detected directly or indirectly by subtraction, the control unit can:

comprise means, which carry out a Kalman filtering, and/or comprise means for the low-pass filtering of the sensor-detected angular position as well as means for the comparison under continuous zero balance of the low-pass filtered, sensor-detected angular position with the angular position, which is calculated by way of an angular velocity, in order to compensate for the angle drift.

The control unit regulates and/or controls the angular position of the boom 02 or of parts of the boom 02, such as, for instance, its cantilevers 21, 22, which are arranged pivotably about respective rotation axes 20, about the at least one rotation axis 20 along the driving direction of the carrier vehicle 10 by means of at least one actuator 03, which comprises, for instance, at least one hydraulic cylinder. Instead of the hydraulic cylinder, other suitable actuators 03 can generally also be employed at any time, for example, pneumatic, electromechanical, or electromotive actuators 03 or actuating means.

The control unit allows for an automatic operating mode, in which the actuator 03 carries out an active motion, in order to thus adapt the angular position of the boom 02 or of parts of the boom 02, such as, for instance, its cantilevers 21, 22, which are arranged pivotably about respective rotation axes 20, in relation to the reference plane.

The invention allows a very accurate determination of a present angular position of the boom 02 or of parts of the boom 02, such as, for instance, its cantilevers 21, 22, which are arranged pivotably about respective rotation axes 20, in relation to a reference plane. In comparison to determining the angular position by way of a plurality of ultrasonic sensors, this is less elaborate and less cost-intensive.

The at least one boom 02 can be arranged at the carrier vehicle 10 in a permanent manner or so as to be exchangeable for another apparatus for agricultural soil treatment and/or growth treatment.

In this context, the carrier vehicle 10 can be driven or towed such that the device 01:

forms a self-propelled agricultural unit or an agricultural self-drive unit, respectively, in the instance of a driven carrier vehicle 10 with a permanently arranged boom 02;

forms a towed agricultural unit, such as, for instance, an agricultural trailer, in the instance of a towed carrier vehicle 10 with a permanently arranged boom 02; and forms either an attachment unit or a mounting unit in the instance of a driven carrier vehicle 10 with a boom 02 that is arranged so as to be exchangeable for another apparatus for agricultural soil treatment and/or growth treatment, for instance at a three-point hitch or on a loading platform provided for this purpose.

The device 01 allows for control by a method, where the control is carried out based on a present angular position by way of a regulation of the angular position of the boom 02, which is arranged at a carrier vehicle 10 to be movable about a rotation axis 20, or of parts of the boom 02, such as, for instance, its cantilevers 21, 22, which are arranged pivotably about respective rotation axes 20.

Figure 7:
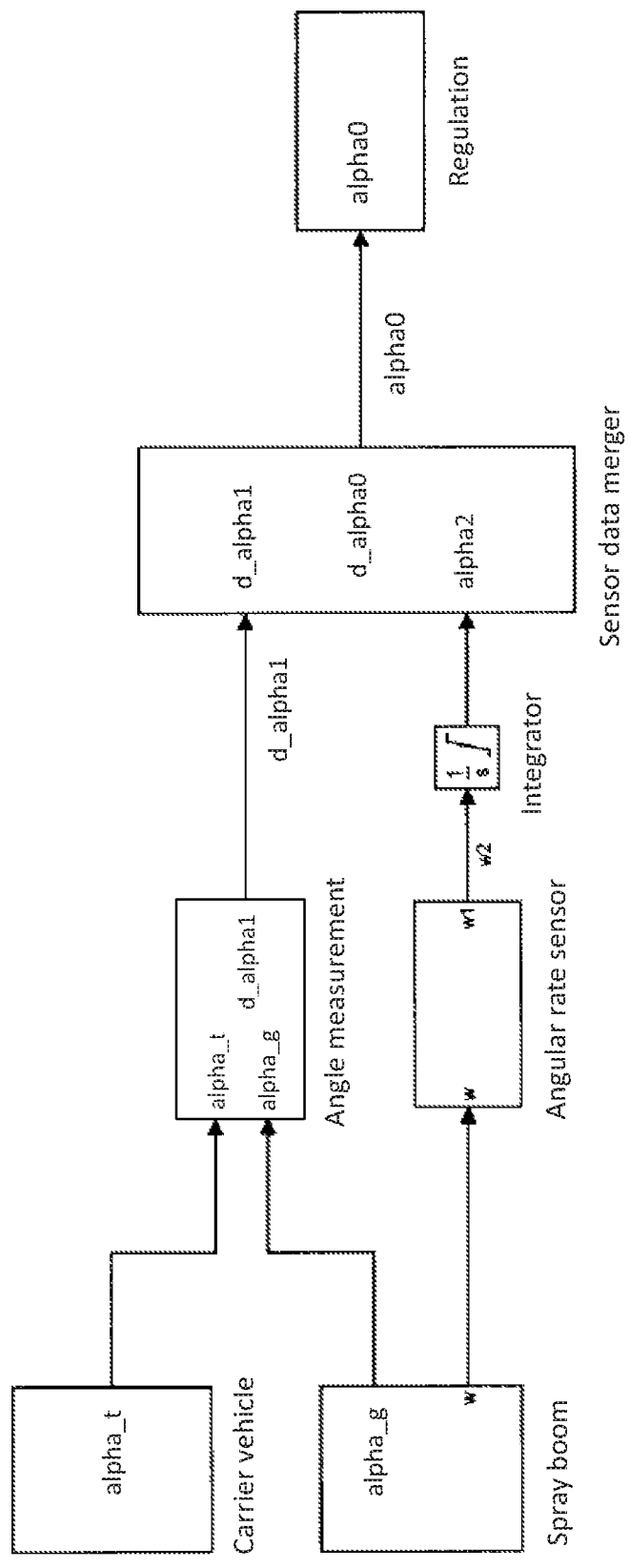
FIG. 7 shows a first exemplary embodiment of a sequence for determining a present angular position of the boom in relation to a reference plane according to a method for the control of a device for spreading liquid and/or solid active agents by way of regulating the angular position of the boom of the device, which boom is arranged at the carrier vehicle to be movable about a rotation axis, the regulation being carried out based on a present angular position.
Figure 8:
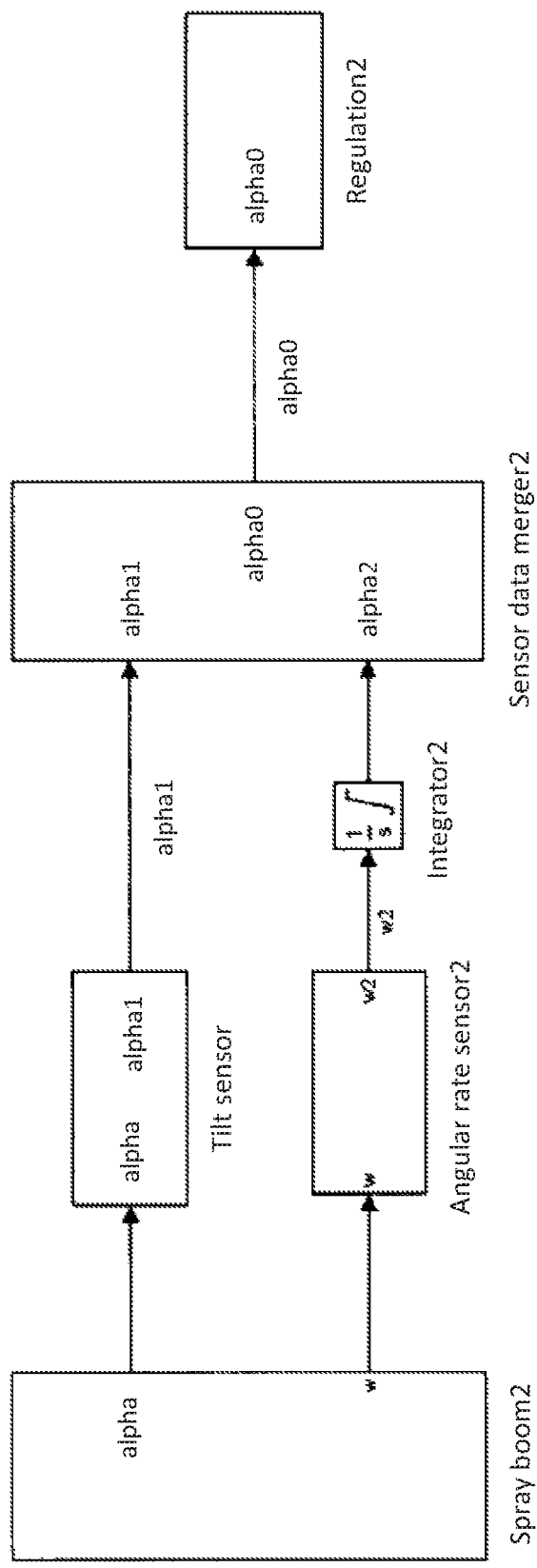
FIG. 8 shows a second exemplary embodiment of a sequence for determining a present angular position of the boom in relation to a reference plane according to a method for the control of a device for spreading liquid and/or solid active agents by way of a regulating the angular position of the boom of the device, which boom is arranged at the carrier vehicle to be movable about a rotation axis, the regulation being carried out in dependence on a present angular position.

Determination of the present angular position in different exemplary embodiments illustrated in FIG. 7 and FIG. 8, is provided in this context:

to detect an angular velocity w of the boom 02 or of parts of the boom 02, such as, for instance, its cantilevers 21, 22, which are arranged pivotably about respective rotation axes 20, about the at least one rotation axis 20 in relation to a reference plane;

to detect, preferably independently of the angular velocity w, an angular position alpha1 or d_alpha1, respectively, of the boom 02 or of parts of the boom 02, such as, for instance, its cantilevers 21, 22, which are arranged pivotably about respective rotation axes 20, about the at least one rotation axis 20 in relation to a reference plane;

to calculate the angular position alpha2 of the boom 02 or of parts of the boom 02, such as, for instance, its cantilevers 21, 22, which are arranged pivotably about respective rotation axes 20, in relation to the reference plane by temporal integration of the detected angular velocity w, whereby neither the carrier vehicle 10 of the device 01 nor translational accelerations, on the one hand, interfere with the calculation of the angular position, however, measurement errors, on the other hand, are also integrated and cause a drift of the angular position alpha1 or d_alpha1, respectively, hereafter termed angle drift; and to merge, for the purpose of compensating the angle drift, the angular position alpha2 of the boom, which angular position alpha2 is calculated by way of the angular velocity w, with the detected angular position alpha1 or d_alpha1, respectively, of the boom 02 or of parts of the boom 02, such as, for instance, its cantilevers 21, 22, which are arranged pivotably about respective rotation axes 20, for the purpose of determining the present angular position alpha0 of the boom 02 or of parts of the boom 02, such as, for instance, its cantilevers 21, 22, which are arranged pivotably about respective rotation axes 20, in relation to the reference plane.

By merging the calculated angular position alpha2 with the measured angular position, referred to as the detected angular position alpha1 or d_alpha1, respectively, the present angular position in relation to the reference plane is determined very precisely, with only the advantages of each of the measuring methods being used and without having to put up with their disadvantages.

By merging the angular position alpha2 of the boom 02 or of parts of the boom 02, such as, for instance, its cantilevers 21, 22, which are arranged pivotably about respective rotation axes 20, in relation to the reference plane, which angular position alpha2 is calculated by means of an angular velocity w, with the angular position alpha1 or d_alpha1, respectively, of the boom 02 or of parts of the boom 02, such as, for instance, its cantilevers 21, 22, which are arranged pivotably about respective rotation axes 20, in relation to the reference plane, which angular position alpha1 or d_alpha1, respectively, is detected independently of the angular velocity w, a control signal can be generated, which returns the boom 02 or parts of the boom 02, such as, for instance, its cantilevers 21, 22, which are arranged pivotably about respective rotation axes 20, from its or their present angular position alpha0, respectively, to a desired angular position in relation to the reference plane.

According to the invention, the angular velocity w can be detected in a plurality of ways.

The angular velocity w can be detected by way of, for instance, at least one angular rate sensor 25, 26, which is arranged on the boom 02 or on parts of the boom 02, such as, for instance, its cantilevers 21, 22, which are arranged pivotably about respective rotation axes 20, which angular rate sensor 25, 26 detects the angular velocity of the boom 02 or of parts of the boom 02, such as, for instance, its cantilevers 21, 22, which are arranged pivotably about respective rotation axes 20.

For the detection of the angular velocity w, an angular rate sensor 25, 26 can accordingly be used, which is mounted directly onto the boom 02 or onto parts of the boom 02, such as, for instance, its cantilevers 21, 22, which are arranged pivotably about respective rotation axes 20. Rotary movements of the carrier vehicle 10 thus have no influence on the determination of the angular velocity w of the boom 02 or of parts of the boom 02, such as, for instance, its cantilevers 21, 22, which are arranged pivotably about respective rotation axes 20. An output signal of an angular rate sensor 25, 26, which output signal is proportional to the measurand or reflects it, thus corresponds to the rotary movement of the boom 02 or of parts of the boom 02, such as, for instance, its cantilevers 21, 22, which are arranged pivotably about respective rotation axes 20, in relation to any optional reference plane, for instance, in relation to the surface of the earth or orthogonal to the acceleration of gravity, respectively, or in relation to a long-term alignment of the carrier vehicle 10 reflecting an averaged ground profile.

This measurand or an output signal respectively, of at least one angular rate sensor 25, 26 detecting angular velocities of the boom 02 or of parts of the boom 02, such as, for instance, its cantilevers 21, 22, which are arranged pivotably about respective rotation axes 20, which output signal is integrated into the control signals and which output signal is proportional to this measurand or reflects it, can be used for the purpose of obtaining an active damping, in the form of an actively induced brake torque, of the boom 02 or of parts of the boom 02, such as, for instance, its cantilevers 21, 22, which are arranged pivotably about respective rotation axes 20.

Alternatively or additionally, the angular velocity w can be detected by way of an angular velocity of the carrier vehicle 10 about its longitudinal axis, which runs in parallel to the rotation axis 20, and by way of a relative rotation between carrier vehicle 10 and boom 02 or between carrier vehicle 10 and parts of the boom 02, such as, for instance, its cantilevers 21, 22, which are arranged pivotably about respective rotation axes 20, such that the absolute angular velocity w of the boom 02 or of parts of the boom 02, such as, for instance, its cantilevers 21, 22, which are arranged pivotably about respective rotation axes 20, about the at least one rotation axis 20 can then be determined from the two measured values angular velocity of the carrier vehicle 10 in relation to its longitudinal axis and relative rotation between carrier vehicle 10 and boom 02 or between carrier vehicle 10 and parts of the boom 02, respectively, such as, for instance, its cantilevers 21, 22, which are arranged pivotably about respective rotation axes 20.

In order to detect the angular velocity w of the boom 02 or of parts of the boom 02, such as, for instance, its cantilevers 21, 22, which are arranged pivotably about respective rotation axes 20, by way of an angular velocity of the carrier vehicle 10 about its longitudinal axis, which runs in parallel to the rotation axis 20, and by way of a relative rotation d_alpha1 between carrier vehicle 10 and boom 02 or by way of one or more relative rotations d_alpha1, respectively, between carrier vehicle 10 and parts of the boom 02, such as, for instance, its cantilevers 21, 22, which are arranged pivotably about respective rotation axes 20, it can be provided to arrange an angular rate sensor at the carrier vehicle 10 of the device 01, in order to detect the angular velocity, also termed roll rate, of the carrier vehicle 10 about its longitudinal axis, and to provide an angle of rotation sensor or a rotational angular velocity sensor between carrier vehicle 10 and boom 02 or an angle of rotation sensor or a rotational angular velocity sensor, respectively, between carrier vehicle 10 and each of the parts of the boom 02, such as, for instance, its cantilevers 21, 22, which are arranged pivotably about respective rotation axes 20.

The angular velocity w can alternatively or additionally be detected by way of temporal integration of an angular acceleration and/or by way of temporal integration of an angular acceleration, which is determined by means of translational accelerations.

In order to detect the angular velocity w, translational accelerations in the area of the cantilevers 21, 22 of the boom 02, preferably at the oppositely positioned ends 23, 24 of the cantilevers 21, 22, can be detected, for instance, and, by way of a difference of the translational accelerations at the oppositely positioned ends 23, 24 of the cantilevers 21, 22 and with the knowledge of the boom width, also termed working width, the angular acceleration of the boom 02 or of parts of the boom 02, such as, for instance, its cantilevers 21, 22, which are arranged pivotably about respective rotation axes 20, can first be calculated and in turn the angular velocity w can be calculated by temporal integration.

The angular position alpha1 of the boom 02 or of parts of the boom 02, such as, for instance, its cantilevers 21, 22, which are arranged pivotably about respective rotation axes 20, about the at least one rotation axis 20 in relation to the reference plane can be detected by way of a tilt angle alpha between the boom 02 or between parts of the boom 02, such as, for instance, its cantilevers 21, 22, which are arranged pivotably about respective rotation axes 20, and the horizontal or vertical (FIG. 8).

The relative rotation d_alpha1 between carrier vehicle 10 and boom 02 or between carrier vehicle 10 and parts of the boom 02, respectively, such as, for instance, its cantilevers 21, 22, which are arranged pivotably about respective rotation axes 20, can be immediately detected, for instance, by way of an angle of twist d_alpha1 between boom 02 and carrier vehicle 10, or indirectly by way of the difference between the angular position alpha_g of the boom 02 about the rotation axis 20 in relation to the reference plane and the angular position alpha_t of the carrier vehicle 10 about its longitudinal axis, which runs in parallel to the rotation axis 20, in relation to the reference plane. The difference of the sensor-detected angle d_alpha1 between the carrier vehicle 10 and the reference plane and of the angle between the boom and the reference plane is proportional to a relative rotation d_alpha1 between carrier vehicle 10 and boom 02. This relative rotation d_alpha1 corresponds to a tilt of the boom 02 or of parts of the boom 02, such as, for instance, its cantilevers 21, 22, which are arranged pivotably about respective rotation axes 20, in relation to a reference plane formed by the carrier vehicle 10, for instance, by its long-term alignment. For the detection of the angular position alpha_g of the boom 02 or of parts of the boom 02, such as, for instance, its cantilevers 21, 22, which are arranged pivotably about respective rotation axes 20, about the at least one rotation axis 20 in relation to the reference plane and of the angular position alpha_t of the carrier vehicle 10 about its longitudinal axis, which runs in parallel to the at least one rotation axis 20, in relation to the reference plane, tilt angle sensors can be provided respectively at the boom 020 and at the carrier vehicle 10 (FIG. 7), which tilt angle sensors detect tilt angles alpha_g between the boom 02 and the vertical and/or the horizontal or tilt angles alpha_t, respectively, between the carrier vehicle 10 and the vertical and/or the horizontal.

For the immediate detection of the relative rotation d_alpha1, an angle of rotation sensor can be provided between boom 02 or between parts of the boom 02, such as, for instance, its cantilevers 21, 22, which are arranged pivotably about respective rotation axes 20, and carrier vehicle 10.

By merging the angular position alpha2 of the boom 02 or of parts of the boom 02, such as, for instance, its cantilevers 21, 22, which are arranged pivotably about respective rotation axes 20, which angular position alpha2 is calculated by means of a detected angular velocity w, with a calculated and/or detected relative rotation d_alpha1 between carrier vehicle 10 and boom 02 or between carrier vehicle 10 and parts of the boom 02, respectively, such as, for instance, its cantilevers 21, 22, which are arranged pivotably about respective rotation axes 20, reference is taken to a reference plane corresponding to a long-term alignment of the carrier vehicle 10 and reflecting an averaged ground profile.

By merging the angular position alpha2 of the boom 02 or of parts of the boom 02, such as, for instance, its cantilevers 21, 22, which are arranged pivotably about respective rotation axes 20, which angular position alpha2 is calculated by means of a detected angular velocity w, with an angular position alpha1 of the boom 02 or of parts of the boom 02, such as, for instance, its cantilevers 21, 22, which are arranged pivotably about respective rotation axes 20, which angular position alpha1 is detected by means of a detection of an angle alpha between the boom 02 or between parts of the boom 02, such as, for instance, its cantilevers 21, 22, which are arranged pivotably about respective rotation axes 20, and the reference plane, reference can be taken to a reference plane corresponding to an artificial horizon.

For the determination of a present angular position alpha0 of the boom 02 or of parts of the boom 02, such as, for instance, its cantilevers 21, 22, which are arranged pivotably about respective rotation axes 20, about the at least one rotation axis 20 in relation to the reference plane by way of merging the angular position alpha2 of the boom 02 or of parts of the boom 02, such as, for instance, its cantilevers 21, 22, which are arranged pivotably about respective rotation axes 20, which angular position alpha2 is calculated by way of an angular velocity w, with the angular position alpha1 or d_alpha1 of the boom 02 or of parts of the boom 02, such as, for instance, its cantilevers 21, 22, which are arranged pivotably about respective rotation axes 20, which angular position alpha1 or d_alpha1 is directly detected or indirectly detected by subtraction, it is preferably provided to carry out a Kalman filtering and/or—in order to compensate for the angle drift—a low-pass filtering of the detected angular position alpha1 or d_alpha1, respectively, as well as a comparison under continuous zero balance of the low-pass filtered detected angular position alpha1 or d_alpha1, respectively, with the angular position alpha2, which is calculated by means of an angular velocity w.

For the detection of the angular velocity w, preferentially at least one angular rate sensor 25, 26 is employed in this context, which angular rate sensor 25, 26 is mounted directly onto the boom 02, such as, for instance onto its middle part, or onto parts of the boom 02, such as, for instance, its cantilevers 21, 22, which are arranged pivotably about respective rotation axes 20. Rotary movements of the carrier vehicle 10 thus have no influence on the determination of the angular velocity w of the boom 02 or of parts of the boom 02, such as, for instance, its cantilevers 21, 22, which are arranged pivotably about respective rotation axes 20. An output signal, which is proportional to the measurand or reflects it, thus corresponds to the rotary movement of the boom 02 or of parts of the boom 02, such as, for instance, its cantilevers 21, 22, which are arranged pivotably about respective rotation axes 20, in relation to any optional reference plane, for instance, in relation to the surface of the earth or orthogonal to the acceleration of gravity, respectively.

It is important to mention that an angular rate sensor 25, 26 is preferably employed for the determination of the angular velocity w, which angular rate sensor 25, 26 is mounted directly onto the boom 02. The rotary movements of the carrier vehicle 10 thus have no influence on the measurement. Its measurand thus corresponds to the rotary movement of the boom in relation to the surface of the earth or orthogonal to the acceleration of gravity, respectively.

The invention also comprises an angular rate sensor 25, 26 on a carrier vehicle 10, the angular rate sensor having the purpose of measuring rotary movements (disturbances) of the carrier vehicle, where the relative rotation d_alpha1 between carrier vehicle 10 and a boom 02, which is preferably designed as spray boom, can be additionally measured by an angle sensor, which is also referred to as a rotary encoder or rotary sensor, or by an angular velocity sensor, which is also referred to as an angular rate sensor, where the absolute angular velocity w of the spray boom can be determined from the two measured values.

The invention accordingly also comprises a carrier vehicle 10 with a boom 02 mounted thereat and with an angular rate sensor 25, 26.

The invention is commercially applicable in particular in the area of the production of agricultural devices for spreading liquid and/or solid active agents.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

The invention claimed is:

1. A device for spreading liquid and/or solid active agents, comprising:
   a carrier vehicle;
   at least one boom arranged pivotably about at least one rotation axis;
   at least one sensor arrangement for the detection of an angular velocity (w) and/or the acceleration of the boom about the rotation axis in relation to a reference plane;
   at least one sensor arrangement for the detection of an angular position (alpha1, d_alpha1) of the boom about the rotation axis in relation to a reference plane;
   a control unit processing output signals (alpha0) of the sensor arrangements to control signals; and
   at least one actuator acting on the present angular position (alpha0) of the boom about the rotation axis in dependence on control signals from the control unit; wherein, for the purpose of determining an angular position (alpha0) of the boom about the rotation axis in relation to an initial alignment, the control unit calculates at least one angular position (alpha2) of the boom in relation to the reference plane by means of temporal integration of the angular velocity (w); and
   wherein the control unit comprises means which carry out a Kalman filtering, and/or comprises means for the low-pass filtering of the sensor-detected angular position (alpha1, d_alpha1) as well as means for the comparison under continuous zero balance of the low-pass filtered, sensor-detected angular position (alpha1, d_alpha1) with the angular position (alpha2), which is calculated by means of an angular velocity (w).

2. The device as recited in claim 1, wherein the control unit by way of the merging of the angular position (alpha2) of the boom, which angular position (alpha2) is calculated by means of the angular velocity (w), with the detected angular position (alpha1, d_alpha1) of the boom, in each case in relation to the reference plane, a control signal is generated from the present angular position (alpha0) of the boom, which control signal returns the boom to a desired angular position in relation to the reference plane.

3. The device as recited in claim 1, wherein the control unit compromises a means to convert control signals to mechanical motion or to another physical quantity, thus producing a force, which exerts a torque on the boom or a force couple, which exerts a torque on the boom.

4. The device of claim 3, wherein the physical force comprises a pressure.

5. A device for spreading liquid and/or solid active agents, comprising:
   a carrier vehicle;
   at least one boom arranged pivotably about at least one rotation axis;
   at least one sensor arrangement for the detection of an angular velocity (w) and/or the acceleration of the boom about the rotation axis in relation to a reference plane;
   at least one sensor arrangement for the detection of an angular position (alpha1, d_alpha1) of the boom about the rotation axis in relation to a reference plane;
   a control unit processing output signals (alpha0) of the sensor arrangements to control signals; and
   at least one actuator acting on the present angular position (alpha0) of the boom about the rotation axis in dependence on control signals from the control unit; wherein, for the purpose of determining an angular position (alpha0) of the boom about the rotation axis in relation to an initial alignment, wherein the control unit:
   calculates at least one angular position (alpha2) of the boom in relation to the reference plane by means of temporal integration of the angular velocity (w);
   detects an angular velocity (w) of the boom about the rotation axis in relation to a reference plane;
   detects an angular position (alpha1, d_alpha1) of the boom about the rotation axis in relation to a reference plane;
   calculates an angular position (alpha2) of the boom in relation to the reference plane by means of temporal integration of the angular velocity (w); and
   merges the angular position (alpha2) of the boom, which angular position (alpha2) is calculated by means of the angular velocity (w), with the detected angular position (alpha1, d_alpha1) of the boom for the purpose of determining the present angular position (alpha0) of the boom in relation to the reference plane; and
   wherein:
   the angular velocity (w) is detected by means of at least one angular rate sensor, which is arranged at the boom and which detects the angular velocity (w) of the boom; and/or
   the angular velocity (w) of the boom is detected by means of an angular velocity of the carrier vehicle about its longitudinal axis, which runs parallel to the rotation axis, and by means of a relative rotation (d_alpha1) between the carrier vehicle and the boom; and/or
   the angular velocity (w) is detected by means of a temporal integration of an angular acceleration; and/or
   the angular velocity (w) is detected by way of a temporal integration of an angular acceleration, which is determined by means of translational accelerations; and/or
   the angular position (alpha1) of the boom about the rotation axis in relation to the reference plane is detected by means of a tilt angle (alpha) between the boom and the horizontal or the vertical.

6. A device for spreading liquid and/or solid active agents, comprising:
   a carrier vehicle;
   at least one boom arranged pivotably about at least one rotation axis;
   at least one sensor arrangement for the detection of an angular velocity (w) and/or the acceleration of the boom about the rotation axis in relation to a reference plane;

at least one sensor arrangement for the detection of an angular position (alpha1, d_alpha1) of the boom about the rotation axis in relation to a reference plane;

a control unit processing output signals (alpha0) of the sensor arrangements to control signals; and at least one actuator acting on the present angular position (alpha0) of the boom about the rotation axis in dependence on control signals from the control unit; wherein, for the purpose of determining an angular position (alpha0) of the boom about the rotation axis in relation to an initial alignment, wherein the control unit:

calculates at least one angular position (alpha2) of the boom in relation to the reference plane by means of temporal integration of the angular velocity (w);

detects an angular velocity (w) of the boom about the rotation axis in relation to a reference plane;

detects an angular position (alpha1, d_alpha1) of the boom about the rotation axis in relation to a reference plane;

calculates an angular position (alpha2) of the boom in relation to the reference plane by means of temporal integration of the angular velocity (w); and merges the angular position (alpha2) of the boom, which angular position (alpha2) is calculated by means of the angular velocity (w), with the detected angular position (alpha1, d_alpha1) of the boom for the purpose of determining the present angular position (alpha0) of the boom in relation to the reference plane; and wherein:

by way of merging the angular position (alpha2) of the boom, which angular position (alpha2) is calculated by the control unit by means of a detected angular velocity (w), with a relative rotation between carrier vehicle and boom, reference is taken to a reference plane corresponding to a long-term alignment of the carrier vehicle; or by way of merging the angular position (alpha2) of the boom, which angular position (alpha2) is calculated by the control unit by means of a detected angular velocity (w), with an angular position (alpha1) of the boom, which angular position (alpha1) is detected by the detection of an angle (alpha) between the boom and the reference plane, reference is taken to a reference plane corresponding to an artificial horizon.

7. The device of claim 6, wherein, for the purpose of determining the present angular position (alpha0) of the boom about the rotation axis in relation to the reference plane by way of merging the angular position (alpha2) of the boom, which angular position (alpha2) is calculated by the control unit by means of an angular velocity (w), with the angular position (alpha1, d_alpha1) of the boom, which is indirectly detected by subtraction.

8. The device as recited in claim 6, in which the control unit merges the angular position (alpha2), which is calculated by means of the angular velocity (w), with the detected angular position (alpha1, d_alpha1), for the purpose of determining the present angular position (alpha0) of the boom in relation to the reference plane in order to generate a control signal therefrom, which returns the boom from its present angular position (alpha0) to a desired angular position in relation to the reference plane.

9. The device as recited in claim 6, wherein the at least one sensor arrangement for the detection of an angular velocity (w) of the boom about the rotation axis in relation to a reference plane comprises at least one angular rate sensor, which is arranged at the boom.

10. The device as recited in claim 6, wherein the at least one sensor arrangement for the detection of an angular velocity (w) of the boom about the rotation axis in relation to a reference plane comprises at least one acceleration sensor, which is arranged in at least one end section of the boom.

11. The device as recited in claim 6, wherein the at least one sensor arrangement for the detection of an angular velocity (w) of the carrier vehicle about the rotation axis in relation to a reference plane comprises at least one angular rate sensor, which is arranged at the carrier vehicle.

12. The device as recited in claim 11 wherein the at least one sensor arrangement for the detection of an angular velocity (w) of the boom about the rotation axis in relation to a reference plane comprises at least one angle of rotation sensor or rotational angular velocity sensor, which detects a relative rotation (d_alpha1) between the carrier vehicle and the boom.

13. The device as recited in claim 12 wherein the at least one sensor arrangement for the detection of an angular velocity (w) of the boom about the rotation axis in relation to a reference plane comprises an angular acceleration sensor instead of or in addition to an angular rate sensor.

14. The device as recited in claim 6 wherein the at least one sensor arrangement for the detection of an angular position (alpha1, d_alpha1) of the boom about the rotation axis in relation to the reference plane comprises at least one sensor, which detects a relative rotation (d_alpha1) between the carrier vehicle and the boom.

15. The device as recited in claim 6 wherein the at least one sensor for the detection of a relative rotation (d_alpha1) between carrier vehicle and boom comprises:

at least one angle of rotation sensor arranged between the boom and the carrier vehicle and/or at least one tilt sensor, which detects an angle (alpha_t) between the carrier vehicle and the reference plane, and at least one tilt sensor, which detects an angle (alpha_g) between the boom and the reference plane.

16. The device as recited in claim 6 wherein the at least one sensor arrangement for the detection of an angular position (alpha1, d_alpha1) of the boom about the rotation axis in relation to the reference plane comprises at least one tilt sensor, which detects an angle (alpha) between the boom and the reference plane.

17. A device for spreading liquid and/or solid active agents, comprising:

a carrier vehicle;

at least one boom arranged pivotably about at least one rotation axis;

at least one sensor arrangement for the detection of an angular velocity (w) and/or the acceleration of the boom about the rotation axis in relation to a reference plane;

at least one sensor arrangement for the detection of an angular position (alpha1, d_alpha1) of the boom about the rotation axis in relation to a reference plane;

a control unit processing output signals (alpha0) of the sensor arrangements to control signals;

at least one actuator acting on the present angular position (alpha0) of the boom about the rotation axis in dependence on control signals from the control unit;

wherein the actuator converts the control signals to a physical quantity of force to produce a force or a force couple which exerts a torque on the boom.

18. The device of claim 17, wherein the physical force is a pressure.

19. A device for spreading liquid and/or solid active agents, comprising:
- a carrier vehicle;
- at least one boom arranged pivotably about at least one rotation axis;
- at least one sensor arrangement for the detection of an angular velocity (w) and/or the acceleration of the boom about the rotation axis in relation to a reference plane;
- at least one sensor arrangement for the detection of an angular position (alpha1, d_alpha1) of the boom about the rotation axis in relation to a reference plane;
- a control unit processing output signals (alpha0) of the sensor arrangements to control signals; and
- at least one actuator acting on the present angular position (alpha0) of the boom about the rotation axis in dependence on control signals from the control unit; wherein, for the purpose of determining an angular position (alpha0) of the boom about the rotation axis in relation to an initial alignment;
- wherein the control unit calculates at least one angular position (alpha2) of the boom in relation to the reference plane by means of temporal integration of the angular velocity (w), and
- wherein the actuator converts the control signals to mechanical movement thus producing a force or a force couple which exerts a torque on the boom.

20. A device for spreading liquid and/or solid active agents, comprising:
- a carrier vehicle;
- at least one boom arranged pivotably about at least one rotation axis;
- at least one sensor arrangement for the detection of an angular velocity (w) and/or the acceleration of the boom about the rotation axis in relation to a reference plane;
- at least one sensor arrangement for the detection of an angular position (alpha1, d_alpha1) of the boom about the rotation axis in relation to a reference plane;
- a control unit processing output signals (alpha0) of the sensor arrangements to control signals;
- at least one actuator acting on the present angular position (alpha0) of the boom about the rotation axis in dependence on control signals from the control unit; wherein, for the purpose of determining an angular position (alpha0) of the boom about the rotation axis in relation to an initial alignment;
- wherein the control unit calculates at least one angular position (alpha2) of the boom in relation to the reference plane by means of temporal integration of the angular velocity (w) and wherein the actuator converts the control signals to a physical quantity to produce a force or a force couple which exerts a torque on the boom.

21. The device of claim 20, wherein the physical quantity is a pressure.

* * * * *